United States Patent
Lee et al.

(10) Patent No.: US 11,742,597 B2
(45) Date of Patent: Aug. 29, 2023

(54) METHOD OF PROCESSING SIGNALS USING RADIO FREQUENCY CHAINS AND ELECTRONIC DEVICE THEREOF

(71) Applicant: Samsung Electronics Co., Ltd., Suwon-si (KR)

(72) Inventors: Hanyeop Lee, Suwon-si (KR); Jiyong Kim, Suwon-si (KR); Jongin Lee, Suwon-si (KR); Hyosung Lee, Suwon-si (KR); Namjun Cho, Suwon-si (KR); Ilpyo Hong, Suwon-si (KR); Hyoseok Na, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 497 days.

(21) Appl. No.: 16/922,327

(22) Filed: Jul. 7, 2020

(65) Prior Publication Data

US 2021/0013632 A1  Jan. 14, 2021

(30) Foreign Application Priority Data

Jul. 8, 2019 (KR) .................. 10-2019-0082077

(51) Int. Cl.
*H01Q 21/28* (2006.01)
*H01Q 3/24* (2006.01)
*H01Q 21/06* (2006.01)
*H04B 1/16* (2006.01)

(52) U.S. Cl.
CPC .............. *H01Q 21/28* (2013.01); *H01Q 3/24* (2013.01); *H01Q 21/062* (2013.01); *H01Q 21/065* (2013.01); *H04B 1/1615* (2013.01)

(58) Field of Classification Search
CPC ........ H01Q 21/28; H01Q 3/24; H01Q 21/062; H01Q 21/065

See application file for complete search history.

(56) References Cited

U.S. PATENT DOCUMENTS

| 3,680,113 | A | 7/1972 | Dorier et al. |
| 4,924,235 | A | 5/1990 | Fujisaka et al. |
| 7,469,152 | B2 | 12/2008 | Cetiner et al. |
| 7,890,145 | B2 | 2/2011 | Catreux-Erceg et al. |
| 9,136,611 | B2 | 9/2015 | Mitchell |

(Continued)

FOREIGN PATENT DOCUMENTS

| CN | 102655418 A | 9/2012 |
| CN | 104303477 A | 1/2015 |

(Continued)

OTHER PUBLICATIONS

Chinese Office Action dated Aug. 24, 2022, issued in Chinese Patent Application No. 202010651104.4.

(Continued)

*Primary Examiner* — Graham P Smith
(74) *Attorney, Agent, or Firm* — Jefferson IP Law, LLP

(57) ABSTRACT

A method and an apparatus for processing signals through Radio Frequency (RF) chains are provided. The electronic device includes a processor, a transceiver including a plurality of RF chains, a plurality of switches electrically connected to the plurality of RF chains, a first antenna array including a plurality of first antenna elements electrically connected to the plurality of switches, and a second antenna array including a plurality of second antenna elements electrically connected to the plurality of switches.

7 Claims, 14 Drawing Sheets

(56) References Cited

U.S. PATENT DOCUMENTS

| | | |
|---|---|---|
| 9,411,039 B2 | 8/2016 | Dehlink et al. |
| 10,170,838 B2 | 1/2019 | Garcia et al. |
| 11,089,595 B1 | 8/2021 | Frigon et al. |
| 2007/0281758 A1 | 12/2007 | Ara et al. |
| 2011/0065400 A1 | 3/2011 | Teikari et al. |
| 2014/0210666 A1 | 7/2014 | Maltsev et al. |
| 2017/0317418 A1 | 11/2017 | Garcia et al. |
| 2019/0006751 A1 | 1/2019 | Chen et al. |
| 2020/0161749 A1 | 5/2020 | Onaka et al. |
| 2020/0303833 A1 | 9/2020 | Ueda |

FOREIGN PATENT DOCUMENTS

| | | |
|---|---|---|
| CN | 106953658 A | 7/2017 |
| CN | 108075784 A | 5/2018 |
| CN | 109586774 A | 4/2019 |
| EP | 3 113 283 A1 | 1/2017 |
| EP | 3 648 360 A1 | 5/2020 |
| KR | 10-2019-0026449 A | 3/2019 |
| KR | 10-2019-0090302 A | 8/2019 |
| WO | 2007/103445 A2 | 9/2007 |
| WO | 2016/207610 A1 | 12/2016 |
| WO | 2019/026595 A1 | 2/2019 |
| WO | 2019/116970 A1 | 6/2019 |

OTHER PUBLICATIONS

European Office Action dated Oct. 13, 2022, issued in European Patent Application No. 20184706.8.

International Search Report dated Oct. 21, 2020, issued in International Patent Application No. PCT/KR2020/008914.

Extended European Search Report dated Dec. 4, 2020, issued in European Patent Application No. 20184706.8.

Huo et al., Cellular and WiFi Co-design for 5G User Equipment, Jul. 9-11, 2018.

Lammers, Taking 5G LNAs to Record Low Voltages, Sep. 11, 2018.

Lie et al., A Review of 5G Power Amplifier Design at cm-Wave and mm-Wave Frequencies, Wireless Communications and Mobile Computing, Hindawi Wireless Communications and Mobile Computing vol. 2018, Jul. 4, 2018, Article ID 6793814, 16 pages, https://doi.org/10.1155/2018/6793814.

Chinese Office Action dated Sep. 1, 2021, issued in Chinese Patent Application No. 202010651104.4.

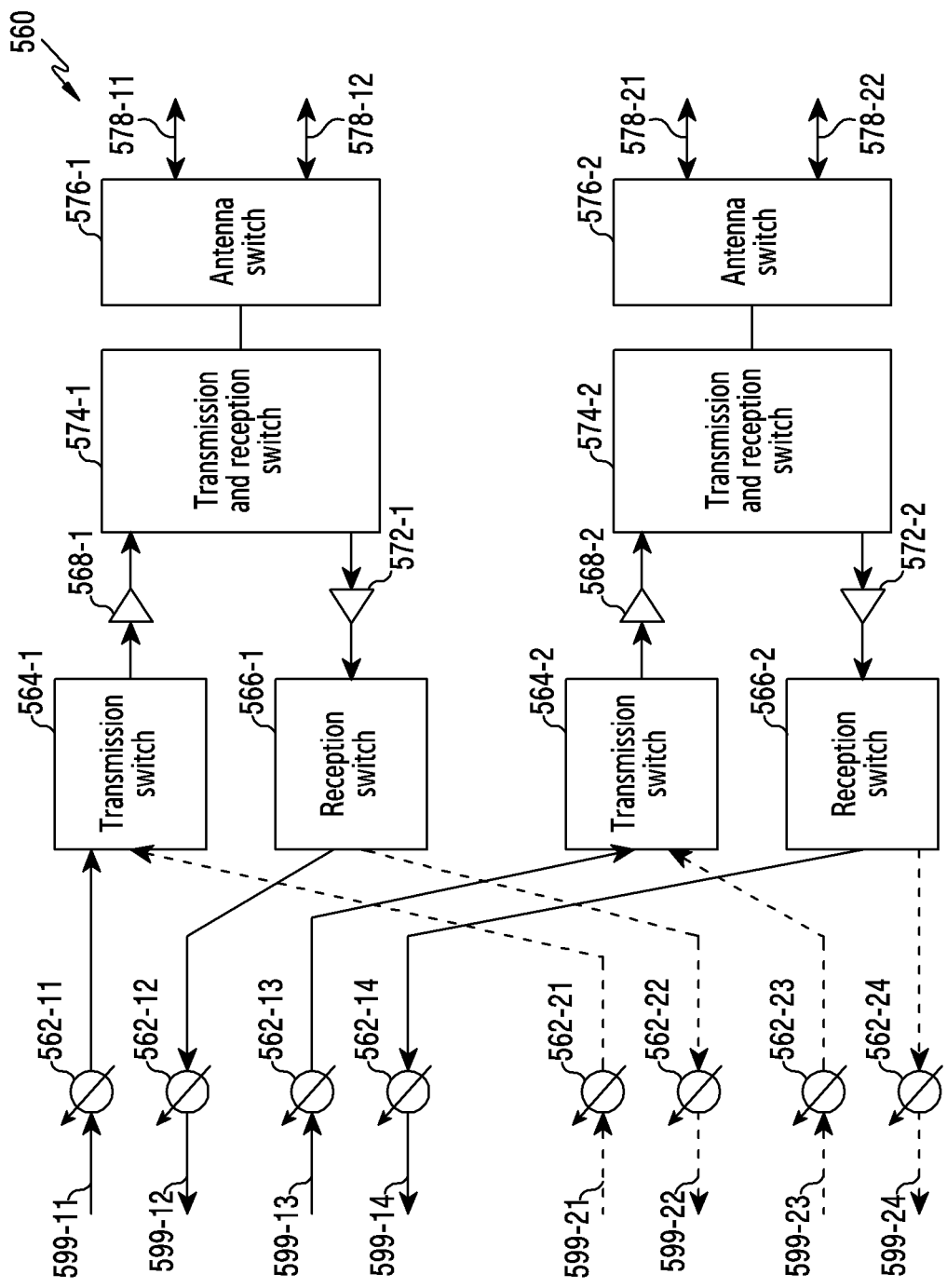

METHOD OF PROCESSING SIGNALS USING RADIO FREQUENCY CHAINS AND ELECTRONIC DEVICE THEREOF

CROSS-REFERENCE TO RELATED APPLICATION(S)

This application is based on and claims priority under 35 U.S.C. § 119(a) of a Korean patent application number 10-2019-0082077, filed on Jul. 8, 2019, in the Korean Intellectual Property Office, the disclosure of which is incorporated by reference herein in its entirety.

BACKGROUND

1. Field

The disclosure relates to an electronic device. More particularly, the disclosure relates to a method of processing signals using Radio Frequency (RF) channels and an electronic device thereof.

2. Description of Related Art

Electronic devices such as smartphones may provide various functions. For example, smartphones may provide short-range wireless communication (for example, Bluetooth, wireless local area network (LAN) or Near Field Communication (NFC)) and mobile communication (Long-Term Evolution (LTE)), LTE-Advanced (LTE-A), or $5^{th}$ Generation New Radio (5G NR) in addition to a basic voice call function.

For wireless communication, the electronic device may generate and/or analyze a Radio Frequency (RF) signal. A circuit for processing the RF signal may need a predetermined physical area within the electronic device. The circuit for processing the RF signal may need a larger space as the structure of RF chains becomes more complex.

The above information is presented as background information only to assist with an understanding of the disclosure. No determination has been made, and no assertion is made, as to whether any of the above might be applicable as prior art with regard to the disclosure.

SUMMARY

When a circuit for processing a Radio Frequency (RF) signal occupies a larger space in an electronic device, the size of the electronic device may increase and the cost of the electronic device may increase.

Aspects of the disclosure are to address at least the above-mentioned problems and/or disadvantages and to provide at least the advantages described below. Accordingly, an aspect of the disclosure is to provide a method and an apparatus for processing RF signals through RF chains having the structure considering the usage state of antennas.

Additional aspects will be set forth in part in the description which follows and, in part, will be apparent from the description, or may be learned by practice of the presented embodiments.

In accordance with an aspect of the disclosure, an electronic device is provided. The electronic device includes a processor, a transceiver including a plurality of RF chains, a plurality of switches electrically connected to the plurality of RF chains, a first antenna array including a plurality of first antenna elements electrically connected to the plurality of switches, and a second antenna array including a plurality of second antenna elements electrically connected to the plurality of switches. Each of the plurality of RF chains may be configured to be selectively connected to one of the first antenna elements and one of the second antenna elements through one of the plurality of switches. The plurality of switches may include a first switch connected to one of the first antenna elements and one of the second antenna elements and a second switch connected to another one of the first antenna elements and another one of the second antenna elements.

In accordance with another aspect of the disclosure, a method of operating an electronic device is provided. The method includes identifying an antenna array to be used for communication among a plurality of antenna arrays, connecting antenna elements of the identified antenna array with RF chains, and processing signals through the RF chains.

A method and an electronic device thereof according to various embodiments can reduce the size of a circuit for processing RF signals through the use of the number of Radio Frequency (RF) chains smaller than the number of antennas.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5C illustrates an example of a configuration of Radio Frequency (RF) chains within an antenna module in an electronic device according to an embodiment of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
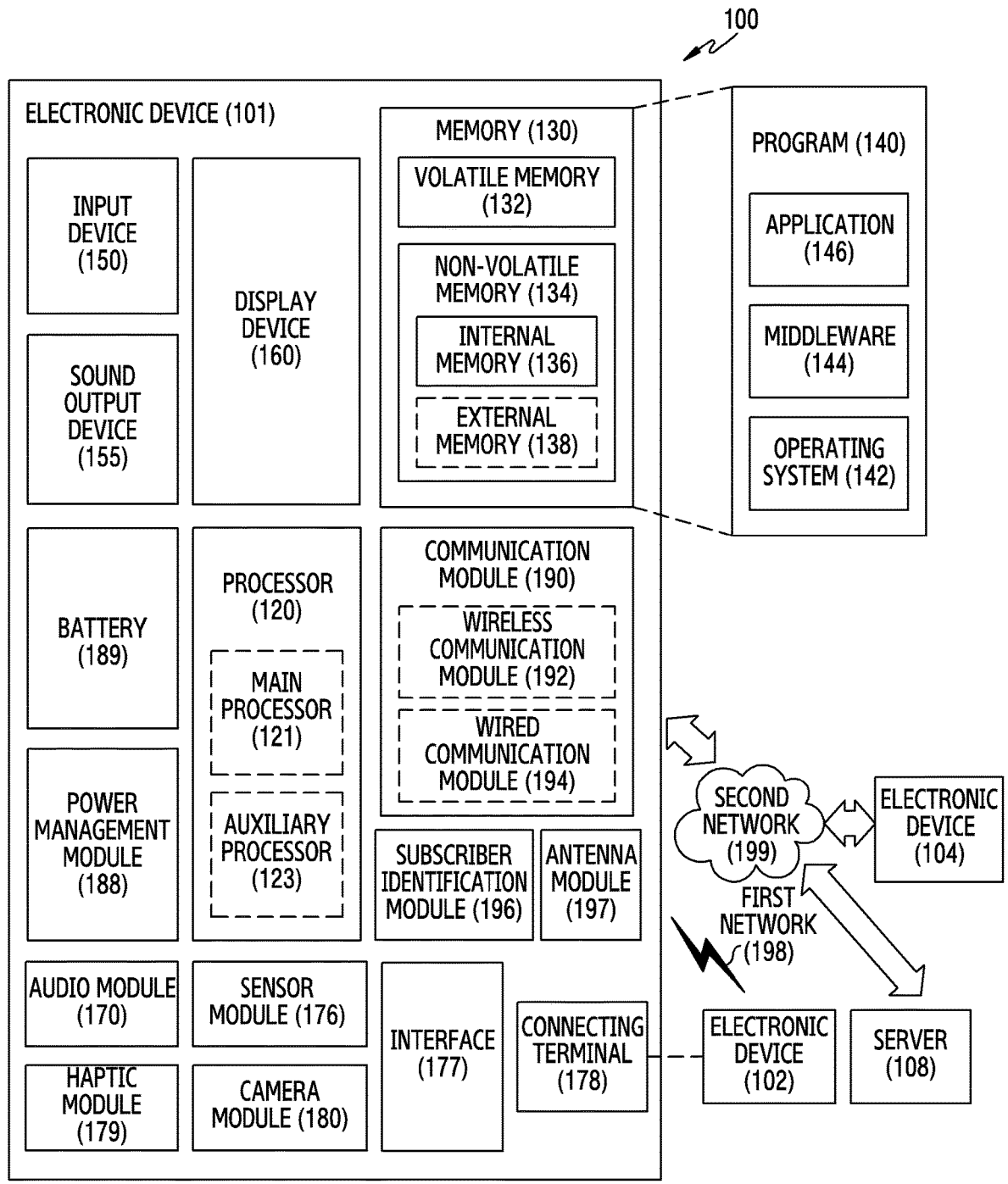
FIG. 1 is a block diagram of an electronic device within a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device 101 of FIG. 1 may perform communication using a signal in a millimeter wave (mmWave) band. For example, in the mmWave band, the electronic device 101 may perform communication according to a 5$^{th}$ Generation (5G) standard. According to an embodiment, in order to reduce loss of the signal in the mmWave band, an antenna module obtained by inserting an antenna and a signal-processing circuit into one module may be used. According to an embodiment, the structure of a processor (for example, the processor 120) and a communication module (for example, the communication module 190) may be the same as illustrated in FIG. 2 below.

Figure 2:
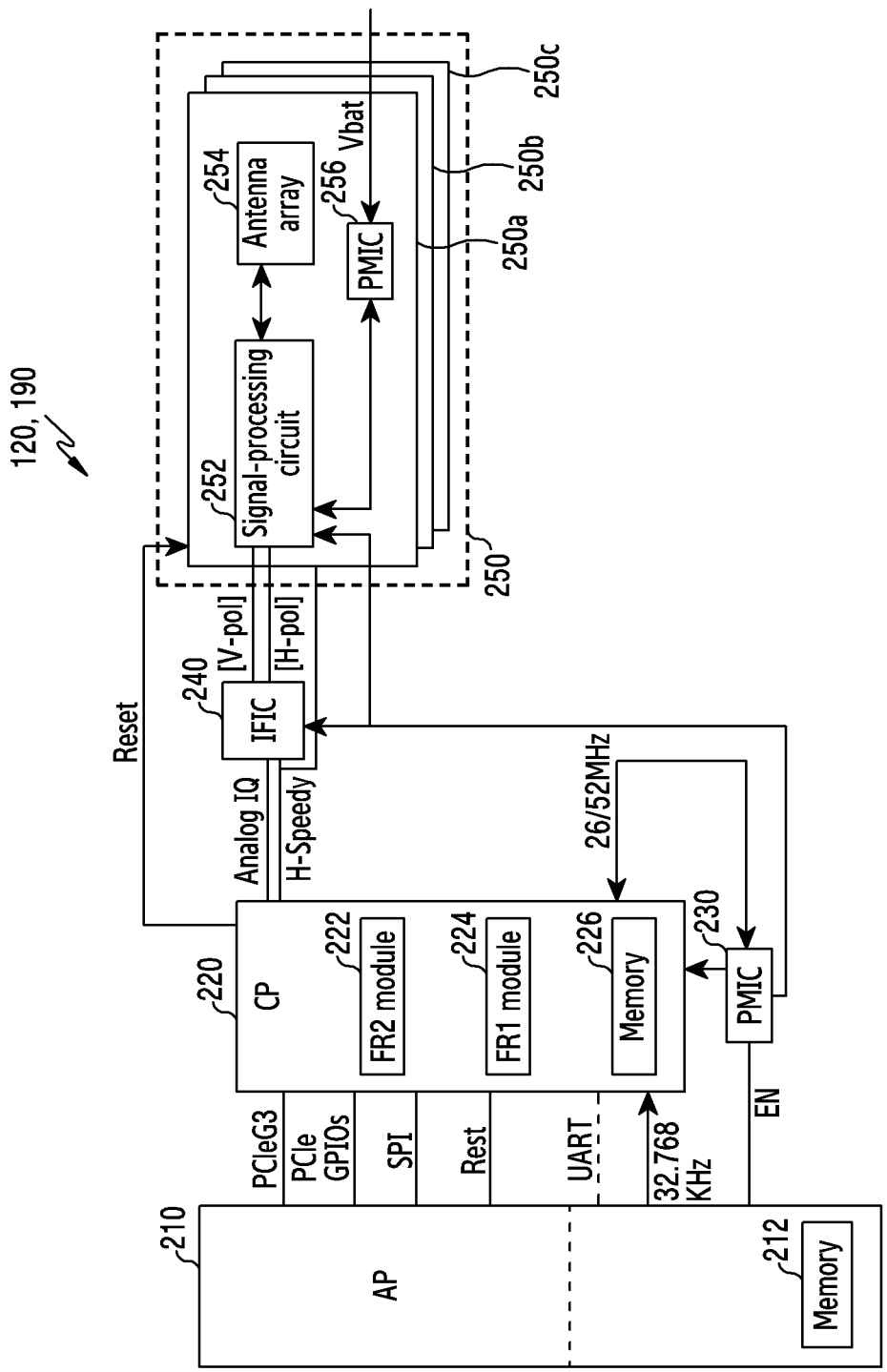
FIG. 2 illustrates an example of a processor and a communication module of an electronic device according to an embodiment of the disclosure.

FIG. 2 illustrates examples of a processor and the communication module 190 according to an embodiment of the disclosure.

FIG. 2 may be understood as an example of the structure for transmitting and/or receiving the signal in the mmWave band.

Referring to FIG. 2, an electronic device (for example, the electronic device 101) may include at least one of an Application Processor (AP) 210, a Communication Processor (CP) 220, a PMIC 230, an Intermediate Frequency Integrated Circuit (IFIC) 240, and/or antenna modules 250. The antenna modules 250 may be referred to as "mmWave modules".

According to an embodiment, the AP 210 may control overall functions of the electronic device and, for example, execute an application and/or control other elements. The AP 210 may include a memory 212 and may use the memory 212 to perform functions. The AP 210 may exchange signals with the CP 220 through various interfaces (for example, PCIeG3, PCIe, GPIOs, Serial Peripheral Interface (SPI), Representational State Transfer (Rest), or Universal Asynchronous Receiver/Transmitter (UART)). For example, the AP 210 may exchange signals of 32.768 KHz with the CP 220.

According to an embodiment, the CP 220 may control communication of the mmWave band. For example, the CP 220 may perform a function of a protocol stack defined by a standard for communication of the mmWave band. The CP 220 may include at least one of a Frequency Range 2 (FR2) module 222, a Frequency Range 1 (FR1) module 224, and/or a memory 226. FR2 may be a frequency area higher than or equal to 6 GHz, and FR1 may be a frequency area lower than 6 GHz. FR2 module 222 may control communication in a frequency area higher than or equal to 6 GHz, and FR1 module 224 may control communication in a frequency area lower than 6 GHz. The memory 226 may store instructions and/or code required for the operation of the CP 220 and may provide a storage space required for calculations.

According to an embodiment, the PMIC 230 may supply power required for operating other elements of the PMIC 230. The PMIC 230 may convert power supplied from a battery (for example, the battery 189) or an external power source into power of a voltage required for each element and then provide the converted power. For example, the PMIC 230 may supply power to at least one of the AP 210, the CP 220, and/or the IFIC 240. The PMIC 230 may exchange a signal of 26/52 MHz with the CP 220.

According to an embodiment, the IFIC 240 may process a signal in an Intermediate Frequency (IF) band. The IFIC 240 may exchange an analog. In-phase/Quadrature (IQ) signal with the CP 220. The IFIC 240 may perform frequency conversion between a baseband signal and an IF band signal and control a gain of a signal.

The antenna modules 250 may process a signal in an RF band. The antenna modules 250 may correspond to the antenna module 197 of FIG. 1 and may include a plurality of antenna modules 250a, 250b, and 250c. The antenna modules 250a, 250b, and 250c may be the same as or similar to each other. Among the antenna modules 250a, 250b, and 250c, the antenna modules 250a may include at least one of a signal-processing circuit 252, an antenna array 254, and/or a PMIC 256. The signal-processing circuit 252 may perform frequency conversion between an IF band and an RF band, control a phase of an RF band signal, and amplify a signal. The signal-processing circuit 252 may exchange a vertical polarization (V-pol) signal and a horizontal polarization (H-pol) signal with the IFIC 240. The signal-processing circuit 252 may include a plurality of RF chains. The antenna array 254 may include a plurality of antennal elements. Although FIG. 2 illustrates only one antenna array as an example, the antenna module 250a may include a plurality of antenna arrays. The PMIC 256 may supply power required for the operation of the signal-processing circuit 252. The PMIC 256 may convert power into a voltage required by the signal-processing circuit 252 on the basis of power input of a voltage of Vbat and provide the converted power. The arrangement and implementation form of at least one of the signal-processing circuit 252, the antenna array 254, and/or the PMIC 256 may vary depending on various embodiments.

Figure 3:
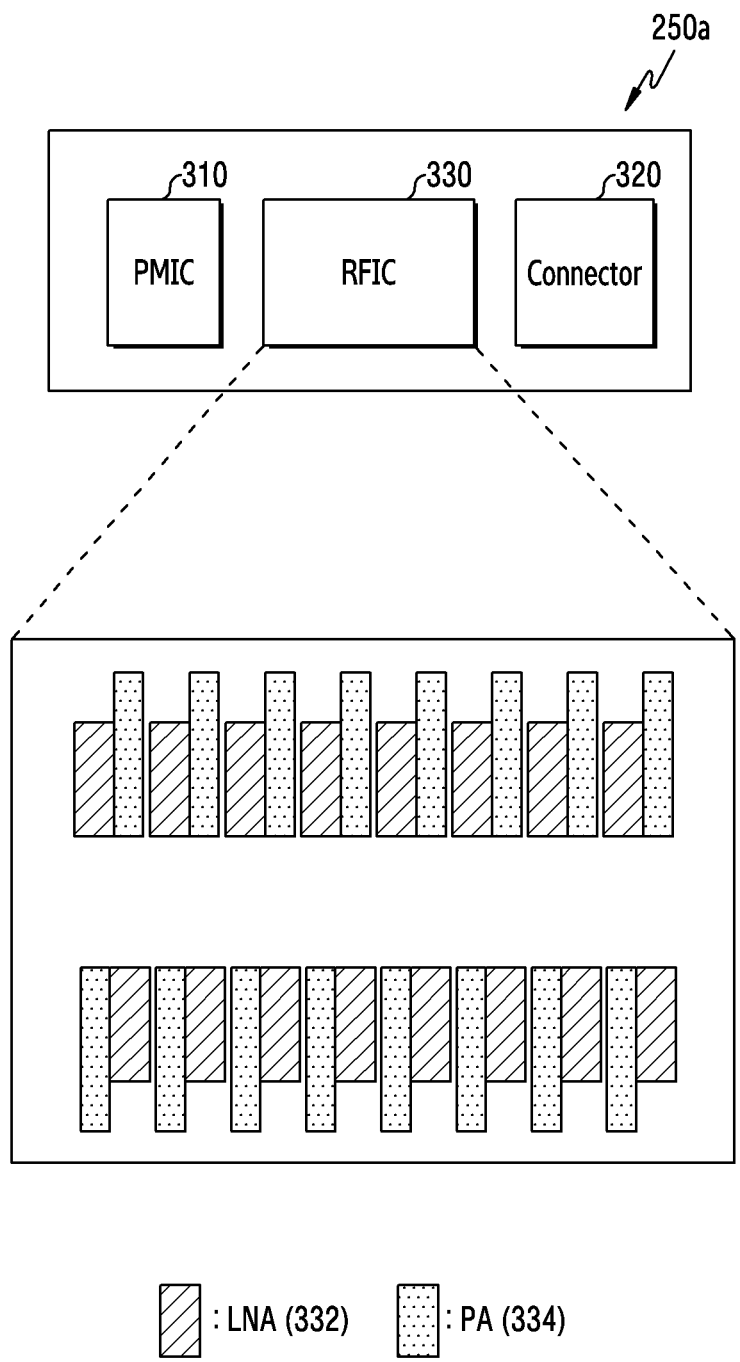
FIG. 3 is a block diagram of an antenna module in an electronic device according to an embodiment of the disclosure.

FIG. 3 is a block diagram of an antenna module in an electronic device according to an embodiment of the disclosure.

Referring to FIG. 3, the antenna module 250a may include at least one of a PMIC 310, a connector 320, and/or an RFIC 330. The PMIC 310 may supply power to the RFIC 330 and correspond to the PMIC 256 of FIG. 2. The connector 320 may include ports for the connection with other elements (for example, the IFIC 240 or the PMIC 230). Through the connector 320, an IF signal, a Local Oscillator (LO) signal, and/or power may be input from a main board, and the input signal may be applied to the PMIC 310 and/or the RFIC 330.

According to an embodiment, the RFIC 330 is a circuit for processing an RF signal, and may include a signal distribution circuit and/or RF chains. The RFIC 330 may correspond to the signal-processing circuit 252 of FIG. 2. The RFIC 330 may include a plurality of RF chains. Each of the plurality of RF chains may include a Low Noise Amplifier (LNA) 332 and a Power Amplifier (PA) 334. According to an embodiment, the RFIC 330 may be implemented as a Complementary Metal-Oxide Semiconductor (CMOS).

Although not illustrated in FIG. 3, the antenna module 250a may include at least one antenna array. According to an embodiment, at least one antenna array may be arranged on a different surface from at least one of the PMIC 310, the connector 320, and/or the RFIC 330. For example, at least one of the PMIC 310, the connector 320, and/or the RFIC 330 may be installed in one surface of a substrate (for example, a Printed Circuit Board (PCB)), and at least one antenna array may be installed in the other surface.

Figure 4:
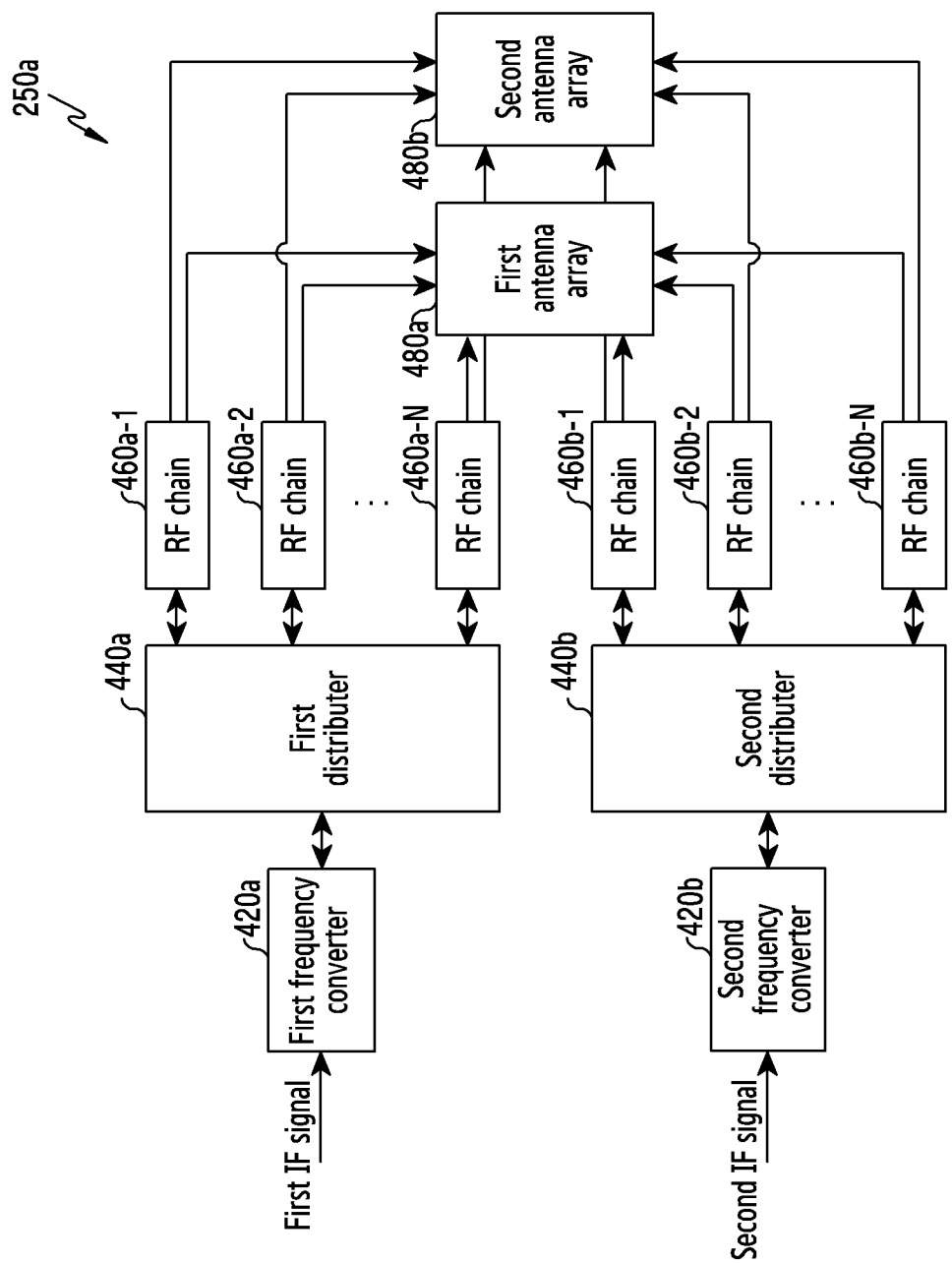
FIG. 4 illustrates an example of a configuration of an antenna module in an electronic device according to an embodiment of the disclosure.

FIG. 4 illustrates an example of a configuration of an antenna module in an electronic device according to an embodiment of the disclosure.

Referring to FIG. 4, the antenna module 250a may include at least one of a first frequency converter 420a, a second frequency converter 420b, a first distributer 440a, a second distributer 440b, a plurality of RF chains 460a-1 to 460a-N and 460b-1 to 460b-N, a first antenna array 480a, and/or a second antenna array 480b.

The first frequency converter 420a and the second frequency converter 420b may convert an IF signal input from the IFIC (for example, the IFIC 240) into an RF signal or convert an RF signal received through the first antenna array 480a or the second antenna array 480b into an IF signal.

The first distributer 440a and the second distributer 440b may distribute or multiplex the signal in order to provide the RF signal input from the first frequency converter 420a or the second frequency converter 420b to at least some of the plurality of RF chains 460a-1 to 460a-N and 460b-1 to 460b-N. The first distributer 440a and the second distributer 440b may de-multiplex the signal input from at least some of the plurality of RF chains 460a-1 to 460a-N and 460b-1 to 460b-N.

The plurality of RF chains 460a-1 to 460a-N and 460b-1 to 460b-N may process (for example, perform phase shift of and/or amplify) the RF signal provided from the first distributer 440a or the second distributer 440b or the RF signal received through the first antenna array 480a or the second antenna array 480b. At least some of the plurality of RF chains 460a-1 to 460a-N and 460b-1 to 460b-N may be used to form one beam.

According to various embodiments, the plurality of RF chains 460a-1 to 460a-N and 460b-1 to 460b-N may include a structure that can be connected to the first antenna array 480a or the second antenna array 480b. According to an embodiment, at least some of the plurality of RF chains 460a-1 to 460a-N and 460b-1 to 460b-N may be selectively connected to one of the first antenna array 480a or the second antenna array 480b during one time instance.

The first antenna array 480a and the second antenna array 480b may include a plurality of antenna elements. According to an embodiment, one of the first antenna array 480a or the second antenna array 480b may be used for communication during one time instance. According to an embodiment, the first antenna array 480a and the second antenna array 480b may have different characteristics. For example, the first antenna array 480a and the second antenna array 480b may differ in at least one of the type (for example, dipole or patch), directions of beams which can be formed, coverage, installation directions (for example, directions in which antenna elements are arranged), and/or installation location.

Hereinafter, the configuration of the elements illustrated in FIG. 4 is described with reference to FIGS. 5A to 5D.

Figure 5A:
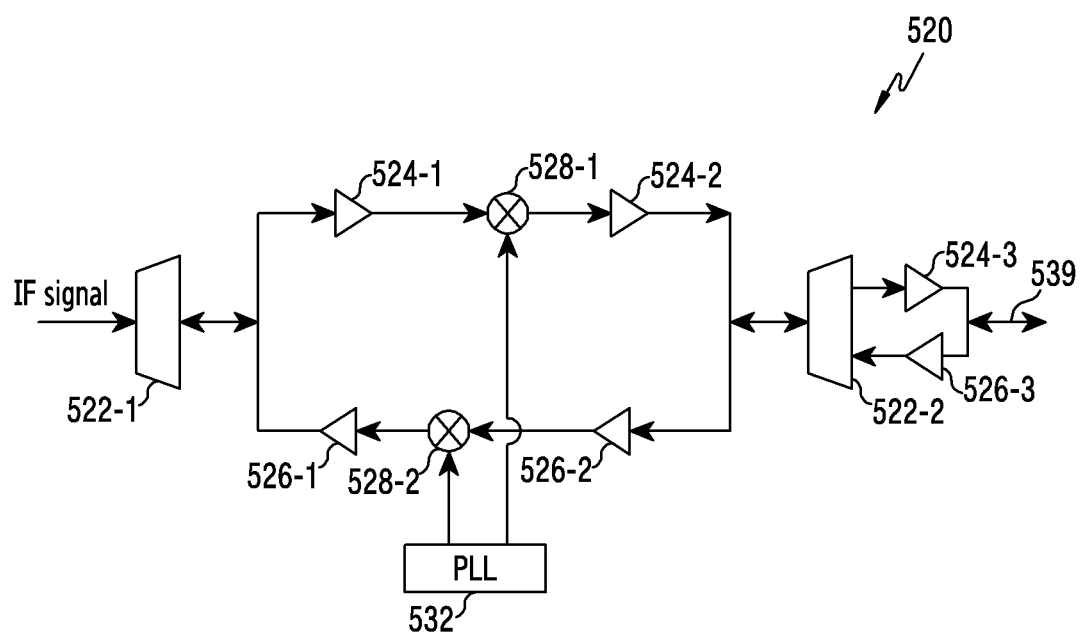
FIG. 5A illustrates an example of a configuration of a frequency converter within an antenna module in an electronic device according to an embodiment of the disclosure.

FIG. 5A illustrates an example of a configuration of a frequency converter within an antenna module in the electronic device according to an embodiment of the disclosure.

The configuration of the frequency converter illustrated in FIG. 5A may be understood as the configuration of the first frequency converter 420a of FIG. 4. The second frequency converter 420b of FIG. 4 may be configured to be similar to that in FIG. 5A.

Referring to FIG. 5A, a frequency converter 520 may include at least one of multiplexers/demultiplexers (MUXs/DEMUXs) 522-1 and 522-2, amplifiers 524-1, 524-2, 524-3, 526-1, 526-2, and 526-3, mixers 528-1 and 528-2, and/or a Phase Loop Lock (PLL) 532.

The MUX/DEMUX 522-1 and 522-2 may multiple or de-multiplex a signal. Although not illustrated in FIG. 5A, the MUXs/DEMUXs 522-1 and 522-2 may receive an IF signal and an LO signal, and may provide the IF signal to the amplifier 524-1 and the LO signal to the PLL 532. The amplifiers 524-1, 524-2, 524-3, 526-1, 526-2, and 526-3 may amplify input signals. The mixers 528-1 and 528-2 may generate the RF signal or the IF signal by multiplexing the signal provided from the PLL 532 and the IF signal or the RF signal. The PLL 532 may generate a frequency signal to be supplied to the mixers 528-1 and 528-2. The mixers 528-1 and 528-2 and the PLL 532 may process frequency up-conversion and/or frequency down-conversion between the IF signal and the RF signal.

When a signal is transmitted, an IF signal from the IFIC (for example, the IFIC 240) may be provided to the amplifier 524-1 through the MUX/DEMUX 552-1. The IF signal may be amplified by the amplifier 524-1 and then converted into an RF signal by the mixer 528-1. The RF signal may be amplified by the amplifier 524-2, provided to the amplifier 524-3 through the MUX/DEMUX 522-2, and then amplified. The amplified signal may be output to the distributer (for example, the first distributer 440a or the second distributer 440b) through a link 539.

When a signal is received, the RF signal provided from the distributer (for example, the first distributer 440a or the second distributer 440b) through the link 539 may be amplified by the amplifier 526-3 and provided to the amplifier 526-2 through the MUX/DEMUX 522-2. The RF signal may be amplified by the amplifier 526-2 and then converted into the IF signal by the mixer 528-2. The IF signal may be amplified by the amplifier 526-1 and then output to the IFIC through the MUX/DEMUX 522-1.

Figure 5B:
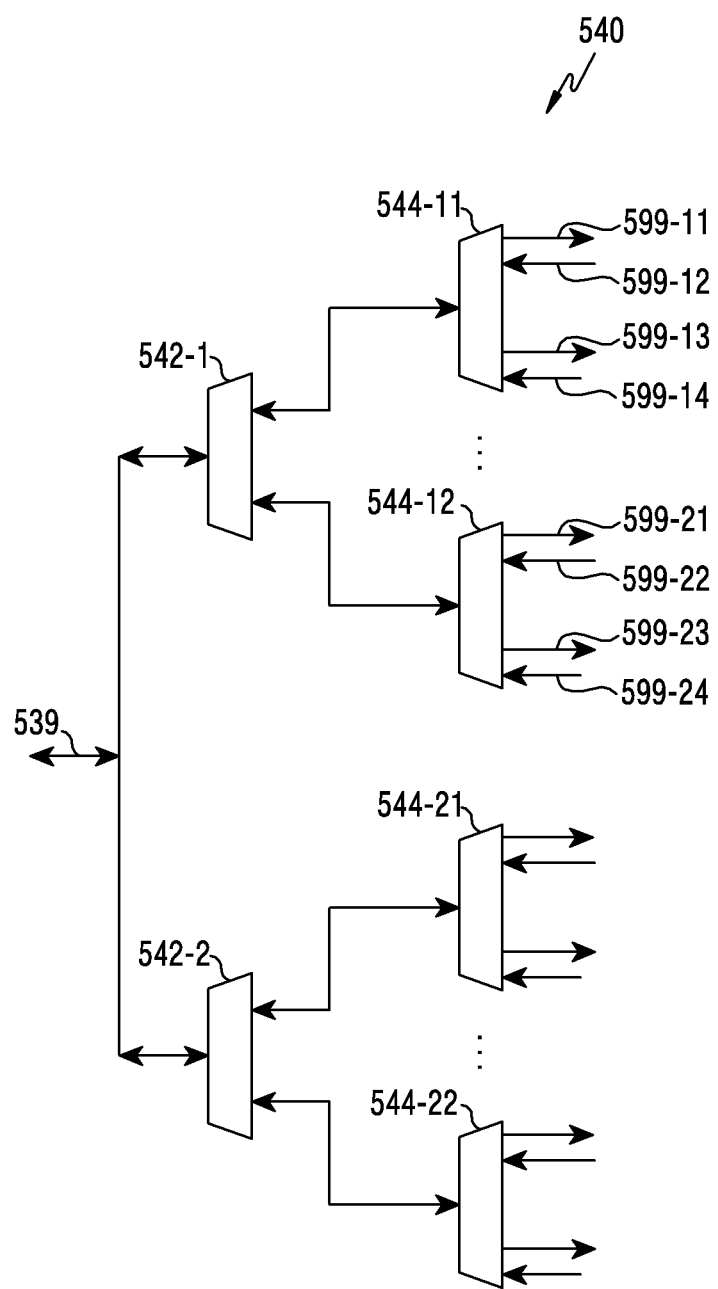
FIG. 5B illustrates an example of a configuration of a distributer within an antenna module in an electronic device according to an embodiment of the disclosure.

FIG. 5B illustrates an example of a configuration of a distributer within an antenna module in an electronic device according to an embodiment of the disclosure.

The configuration of the distributer illustrated in FIG. 5B may be understood as the configuration of the first distributer 440a of FIG. 4. The second distributer 440b of FIG. 4 may be configured to be similar to that in FIG. 5B.

Referring to FIG. 5B, a distributer 540 may include a plurality of hierarchically arranged MUXs/DEMUXs 542-1, 542-2, 544-11 to 544-12, and 544-21 to 544-22. The first-state MUX/DEMUX 542-1 may be connected to the second-state MUXs/DEMUXs 544-11 to 544-12, and the first-state MUX/DEMUX 542-2 may be connected to the second-state MUXs/DEMUXs 544-21 to 544-22. Although FIG. 5B illustrates an embodiment in which one first-state MUX/DEMUX (for example, the first-state MUX/DEMUX 542-1 or the second-state MUX/DEMUX 542-2) is connected to two second-state MUXs/DEMUXs (for example, the second-state MUX/DEMUX 544-11 to 544-12 or the second-state MUX/DEMUX 544-21 to 544-22), one first-state MUX/DEMUX may be connected to three or more second-state MUXs/DEMUXs according to another embodiment.

According to an embodiment, the MUXs/DEMUXs 544-11 to 544-12 may multiplex signals output to RF chains and de-multiplex signals input from RF chains. For example, the MUX/DEMUX 544-11 may multiplex or de-multiplex signals transmitted or received through RF chains connected to a first antenna array (for example, the first antenna array 480a), and the MUX/DEMUX 544-12 may multiplex or de-multiplex signals transmitted or received through RF chains connected to a second antenna array (for example, the second antenna array 480b). The MUX/DEMUX 544-11 may exchange signals with RF chains through paths 559-11 to 559-14. The MUX/DEMUX 544-12 may exchange signals with RF chains through paths 559-21 to 559-24.

According to an embodiment, the MUXs/DEMUXs 544-21 to 544-22 may multiplex signals output to RF chains and de-multiplex signals input from RF chains. For example, the MUX/DEMUX 544-21 may multiplex or de-multiplex signals transmitted or received through RF chains connected to a first antenna array (for example, the first antenna array 480a), and the MUX/DEMUX 544-22 may multiplex or de-multiplex signals transmitted or received through RF chains connected to a second antenna array (for example, the second antenna array 480b).

FIG. 5C illustrates an example of a configuration of RF chains within an antenna module in an electronic device according to an embodiment of the disclosure.

The configuration of the RF chains illustrated in FIG. 5C may be understood as the configuration of the RF chains 460a-1 to 460a-N of FIG. 4. The RF chains of FIG. 4 or the RF chains 460b-1 to 460b-N may be configured to be similar to the example of FIG. 5C. For example, the RF chains 560 illustrated in FIG. 5C may be understood as RF chains connected to the MUXs/DEMUXs 544-11 to 544-12 and/or the MUXs/DEMUXs 544-21 to 544-22 of FIG. 5B.

Referring to FIG. 5C, an antenna RF chains 560 may include at least one of phase shifters 562-11 to 562-14 and 562-21 to 562-24, transmission switches 564-1 and 564-2, reception switches 566-1 and 566-2, PAs 568-1 and 568-2, LNAs 572-1 and 572-2, transmission and reception switches 574-1 and 574-2, and/or antenna switches 576-1 and 576-2.

The phase shifters 562-11 to 562-14 and 562-21 to 562-24 may control and then output the phase of the input RF signal. The phase shifters 562-11 to 562-14 may be connected to at least one MUX/DEMUX (for example, the MUX/DEMUX 544-11) of the distributer 540 through paths 559-11 to 559-14. The phase shifters 562-21 to 562-24 may be connected to at least one MUX/DEMUX (for example, the MUX/DEMUX 544-21) of the distributer 540 through paths 559-12 to 559-24. The phase value determined by the phase shifters 562-11 to 562-14 and 562-21 to 562-24 may be determined by a control signal. For example, the control signal may be input from another element (for example, the CP 220). The phase shifters 562-11 to 562-14 and the phase shifters 562-21 to 562-24 may correspond to different antenna arrays. For example, the phase shifters 562-11 to 562-14 may be used to control phases of signals transmitted or received through a first antenna array (for example, the first antenna array 480a), and the phase shifters 562-21 to 562-24 may be used to control phases of signals transmitted or received through a second antenna array (for example, the second antenna array 480b).

According to an embodiment, the transmission switches 564-1 and 564-2 may selectively output one of signals corresponding to different antenna arrays. For example, the transmission switch 564-1 may output a signal passing through the phase shifter 562-11 or the phase shifter 562-21 to the PA 568-1. The reception switches 566-1 and 566-2 may output a signal received through one of the antenna arrays to a corresponding phase shifter. For example, the reception switch 566-1 may output a signal input from the LNA 572-1 to the phase shifter 562-12 or the phase shifter 562-22. When the signal input to the reception switch 566-1 is a signal received through the first antenna array, the signal may be output to the phase shifter 562-12. When the signal is a signal received through the second antenna array, the signal may be output to the phase shifter 562-22.

The PAs 568-1 and 568-2 may amplify a signal provided from the transmission switch 564-1 or the transmission switch 564-2. The LNAs 572-1 and 572-2 may amplify a signal provided from the transmission and reception switch 574-1 or the transmission and reception switch 574-2.

The transmission and reception switches 574-1 and 574-2 may perform switching between a transmission path and a reception path. For example, when a signal is transmitted, the transmission and reception switch 574-1 may output a signal input from the PA 568-1 to the antenna switch 576-1. When a signal is received, the transmission and reception switch 574-1 may output a signal input from the antenna switch 576-1 to the LNA 572-1.

According to an embodiment, the antenna switches 576-1 and 576-2 may switch a path between the first antenna array or the second antenna array and the transmission and reception switch (for example, the transmission and reception switch 574-1 or the transmission and reception switch 574-2). For example, the antenna switch 576-1 may selectively connect the transmission and reception switch 574-1 to a path 578-11 connected to the first antenna array or a path 578-12 connected to the second antenna array. The antenna switch 576-2 may selectively connect the transmission and reception switch 574-2 to a path 578-21 connected to the first antenna array or a path 578-22 connected to the second antenna array.

According to an embodiment, the transmission and reception switch 574-1 or 574-2 may have one terminal on one side toward the antenna switch 576-1 or 576-2 and two terminals on the other side. The antenna switch 576-1 or 576-2 may have two terminals on one side toward the transmission and reception switch 574-1 or 574-2 and one terminal on the other side. Although FIG. 5C illustrates the transmission and reception switch 574-1 or 574-2 and the antenna switch 576-1 or 576-2 as separate elements, the transmission and reception switch 574-1 or 574-2 and the antenna switch 576-1 or 576-2 may be implemented as a single element according to another embodiment. For example, the transmission and reception switch 574-1 or 574-2 and the antenna switch 576-1 or 576-2 may be implemented as one Double Pole Double Through (DPDT).

Figure 5D:
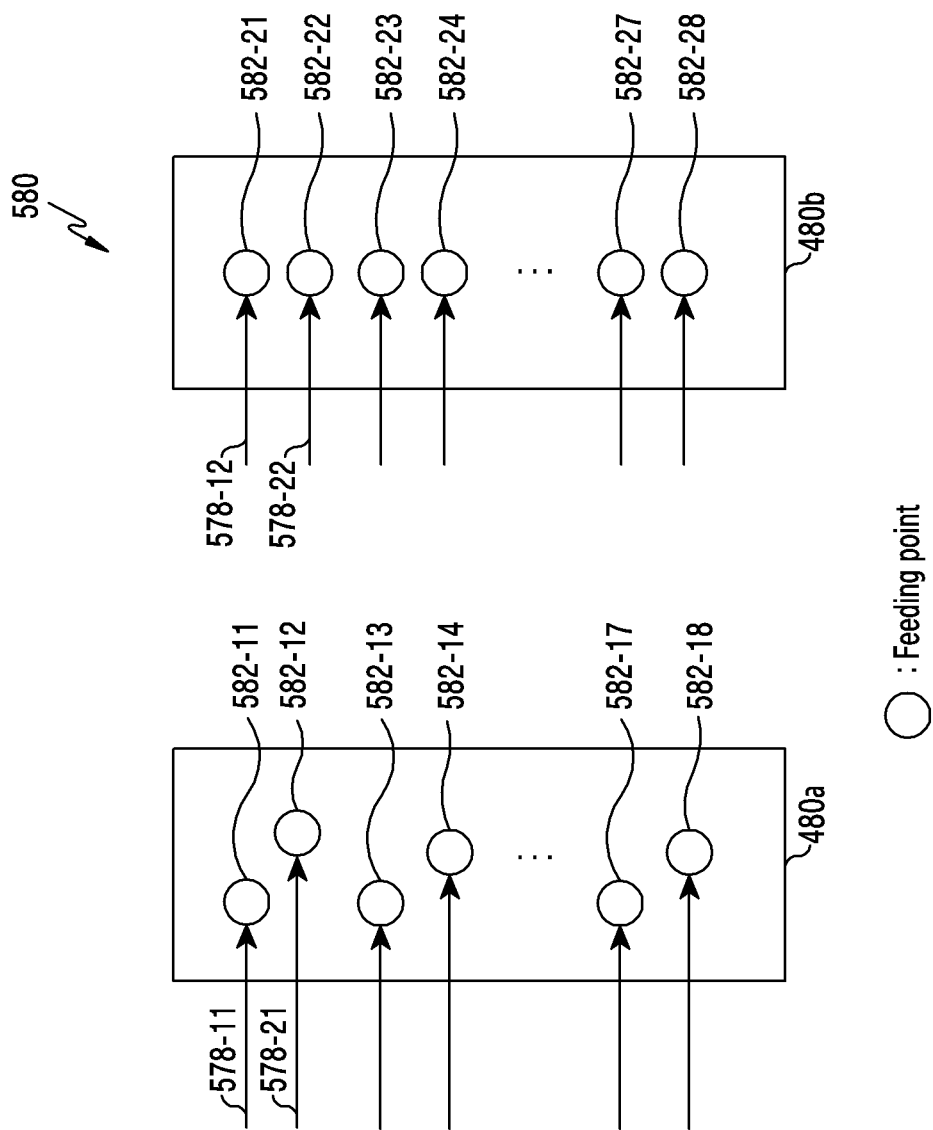
FIG. 5D illustrates an example of a configuration of antenna arrays within an antenna module in an electronic device according to an embodiment of the disclosure.

FIG. 5D illustrates an example of a configuration of antenna arrays within an antenna module in an electronic device according to an embodiment of the disclosure.

The configuration of the antenna arrays illustrated in FIG. 5D may be understood as the configuration of the first antenna array 480a and the second antenna array 480b of FIG. 4. Although each antenna array (for example, the first antenna array 480a or the second antenna array 480b) includes eight antenna feeding points in FIG. 5D, each antenna array may include seven or fewer antenna feeding points or nine or more antenna feeding points according to another embodiment.

Referring to FIG. 5D, an antenna arrays 580 may include the first antenna array 480a and/or the second antenna array 480b. The first antenna array 480a may include a plurality of antenna feeding points 582-11 to 582-18, and the second antenna array 480b may include a plurality of antenna feeding points 582-21 to 582-28. Among the feeding points illustrated in FIG. 5D, one feeding point may be included in one antenna element or two feeding points may be included in one antenna element. For example, although FIG. 5D illustrates sixteen feeding points, the number of antenna elements may be sixteen or fewer. This is because a plurality of feeding points may be included in one antenna element. When two feeding points are included in one antenna element, two feeding points may be used to form different polarized waves (for example, vertically polarized wave and/or horizontally polarized wave).

According to an embodiment, the first antenna array 480a and the second antenna array 480b may include different types of antennas. For example, the first antenna array 480a may be a set of patch antennas, and the second antenna array 480b is a set of dipole antennas. According to an embodiment, some of a plurality of antenna feeding points included in the first antenna array 480a or the second antenna array 480b may be vertically polarized antennas, and the remaining antenna feeding points may be horizontally polarized antennas. Antenna feeding points 582-11 and 582-12 among the antenna feeding points 582-11 to 582-18 included in the first antenna array 480a may be connected to the paths 578-11 and 578-21 illustrated in FIG. 5C, and antenna feeding points 582-21 and 582-22 among the antenna feeding points 582-21 to 582-28 included in the second antenna array 480b may be connected to the paths 578-12 and 578-22 illustrated in FIG. 5C.

Referring to FIGS. 4, 5A to 5D, four RF chains may be connected to one distributer (for example, the first distributer 440a or the second distributer 440b), and one RF chain may be connected to one second-state MUX/DEMUX (For example, one of the second-state MUXs/DEMUXs 544-11, 544-12, 544-21, and 544-22). In consideration of the entire circuit illustrated in FIG. 4, eight RF chains may be used for sixteen (=2N) antenna feeding points included in two antenna arrays (for example, the first antenna array 480a and the second antenna array 480b) belonging to one RF module. Feeding for at least some of the sixteen antenna feeding points may be performed using the eight RF chains, and one or a plurality of feedings may be performed per antenna element.

A difference between numbers of antenna feeding points and RF chains may be allowed on the basis of the fact that two antenna arrays are not simultaneously used. For example, the first antenna array and the second antenna array may be used to form different beam subsets among all beams which can be formed by the electronic device 101. For example, when the electronic device 101 is able to form 20 beams having different directions, the first antenna array may be used to form 5 beams among the 20 beams, and the second antenna array may be used to form 5 other beams among the 20 beams. Unless one RF module simultaneously forms two beams, the first antenna array and the second antenna array may not be used at the same time.

When RF chains corresponding to half the number of antenna feeding points are used, numbers of PAs and LNAs may be reduced by half in comparison to the case in which RF chains corresponding to the number of antenna feeding points are used. PAs and LNAs are elements occupying a large area of the RF module, and thus the size of the RF module may be significantly reduced due to a decrease in the numbers of PAs and LNAs. The switch may be used due to a difference in numbers of the RF chains and the antenna feeding points and loss may be generated by the switch, but the loss by the switch may be compensated if gains of PAs and LNAs are increased.

In the embodiment described with reference to FIG. 5C, the number of RF chains is smaller than the number of antenna feeding points but independent phase shifters are used for respective antenna arrays, and thus the phase shifters 562-11 to 562-14 and 562-21 to 562-24 may be the same as the number of antenna feeding points. According to another embodiment, the phase shifters may be shared between antenna arrays. The structure in which the phase shifters are shared between the antenna arrays will be described below with reference to FIG. 6.

Figure 6:
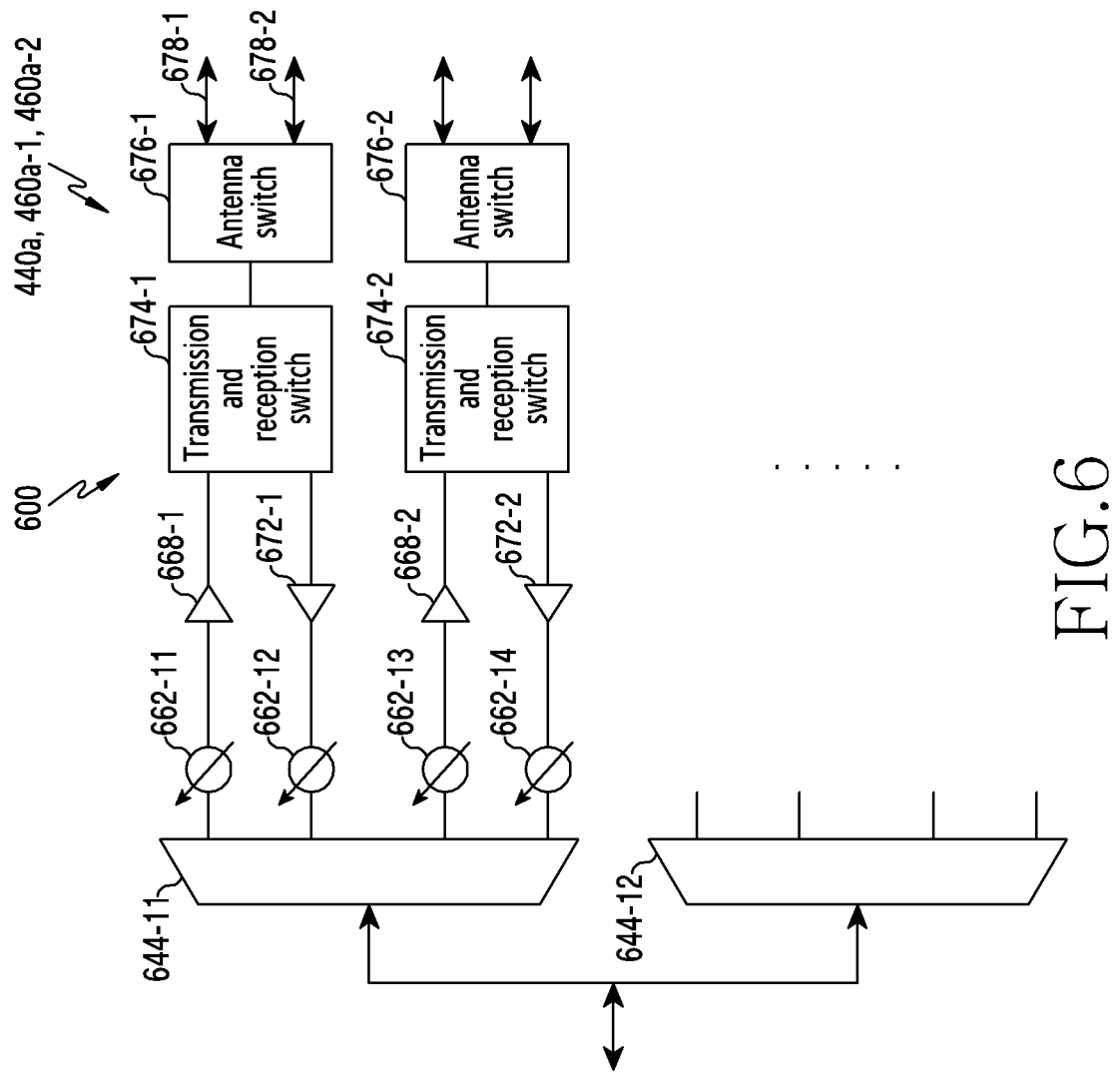
FIG. 6 illustrates another example of a configuration of a distributer and RF chains within an antenna module in an electronic device according to an embodiment of the disclosure.

FIG. 6 illustrates an example of another configuration of a distributer and RF chains within an antenna module in an electronic device according to an embodiment of the disclosure.

The configuration of the antenna arrays 580 illustrated in FIG. 6 may be understood as the configuration of the first distributer 440a and the RF chains 460a-1 to 460a-N of FIG. 4.

Referring to FIG. 6, the distributer and RF chains 600 may include at least one of MUXs/DEMUXs 644-1 and 644-2, phase shifters 662-11 to 662-14, PAs 668-1 and 668-2, LNAs 672-1 and 672-2, transmission and reception switches 674-1 and 674-2, and/or antenna switches 676-1 and 676-2. Although omitted for convenience of description, an element (or elements) equivalent to at least one of the phase shifters 662-11 to 662-14, the PAs 668-1 and 668-2, the LNAs 672-1 and 672-2, the transmission and reception switches 674-1 and 674-2, and/or the antenna switches 676-1 and 676-2, connected to the MUX/DEMUX 644-2 may be further included.

The MUXs/DEMUXs 644-1 and 644-2 may output an RF signal input from a frequency converter (for example, the first frequency converter 420a) to the phase shifters 662-11 and 662-13, or may sum RF signals input from the phase shifters 662-12 and 662-14 and then output the RF signal to the frequency converter.

The phase shifters 662-11 to 662-14 may control and then output a phase of the input RF signal. The controlled phase value may be determined by a control signal. For example, the control signal may be input from another element (for example, the CP 220). According to an embodiment, the phase shifters 662-11 to 662-14 may be shared by antenna arrays (for example, the first antenna array 480a and the second antenna array 480b). For example, the phase shifter 662-11 may be used to control the phase of the signal transmitted through the first antenna array during a time instance and used to control the phase of the signal transmitted through the second antenna array during another time instance. For example, the phase shifters 662-11 to 662-14 may control the phase of the signal provided to the antenna array used for transmitting the signal.

The PAs 668-1 and 668-2 may amplify the signal input from the phase shifter 662-11 or 662-13. The LNAs 672-1 and 672-2 may amplify the signal input from the transmission and reception switch 674-1 or 674-2.

The transmission and reception switches 674-1 and 674-2 may perform switching between a transmission path and a reception path. For example, when a signal is transmitted, the transmission and reception switch 674-1 may output a signal input from the PA 668-1 to the antenna switch 676-1. When a signal is received, the transmission and antenna switch 676-1 may output a signal input from the antenna switch 676-1 to the LNA 572-1.

According to an embodiment, the antenna switches 676-1 and 676-2 may switch a path between the first antenna array or the second antenna array and the transmission and reception switch (for example, the transmission and reception switch 674-1 or the transmission and reception switch 674-2). For example, the antenna switch 676-1 may selectively connect the transmission and reception switch 674-1 to a path 678-1 connected to the first antenna array or a path 678-2 connected to the second antenna array.

According to an embodiment, the transmission and reception switch 674-1 or 674-2 may have one terminal on one side toward the antenna switch 676-1 or 676-2 and two terminals on the other side. The antenna switch 676-1 or 676-2 may have one terminal on one side toward the transmission and reception switch 674-1 or 674-2 and two terminals on the other side. Although FIG. 6 illustrates the transmission and reception switch 674-1 or 674-2 and the antenna switch 676-1 or 676-2 as separate elements, the transmission and reception switch 674-1 or 674-2 and the antenna switch 676-1 or 676-2 may be implemented as a single element according to another embodiment. For example, the transmission and reception switch 674-1 or 674-2 and the antenna switch 676-1 or 676-2 may be implemented as one DPDT.

According to an embodiment, phase shifters which are the same as the number of RF chains and smaller than the number of antenna feeding points may be included. Compared to the example of FIG. 5C, the number of phase shifters may be reduced, and complexity of the RF module may be reduced and the size thereof may be reduced because a plurality of switches (for example, the transmission switches 564-1 and 564-2 and the reception switches 566-1 and 566-2) are excluded.

As described in the various embodiments, the number of RF chains is designed to be smaller than the number of antenna feeding points in the RF module, and thus at least one of the complexity, costs, and/or size of the RF module may be improved. According to an embodiment, the RFIC (for example, the RFIC 330) included in the RF module may be implemented as a CMOS in order to increase a degree of integration. The CMOS may have a good degree of integration, but not have optimal performance.

According to various embodiments of the disclosure, some elements of the RFIC may be separated as a separate integrated circuit. For example, amplifiers (for example, the PAs and/or the LNAs) may be separated as a separate integrated circuit. As the amplifiers are separated as a separate integrated circuit, each of the RC chains may be segmented into two portions. For example, the separate integrated circuit may be implemented as a heterogeneous compound semiconductor such as GaAs or SiGe. Hereinafter, embodiments of a separate integrated circuit including amplifiers will be described.

Figure 7:
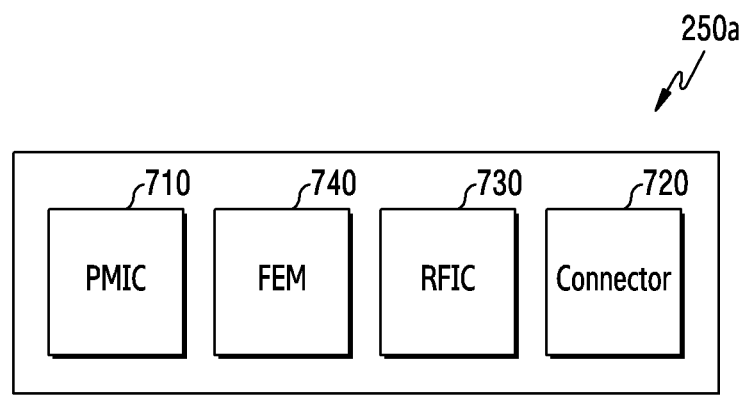
FIG. 7 is a block diagram of an antenna module including segmented RF chains in an electronic device according to an embodiment of the disclosure.

FIG. 7 is a block diagram of an antenna module including segmented RF chains in an electronic device according to an embodiment of the disclosure.

Referring to FIG. 7, the antenna module 250*a* according to an embodiment may include at least one of a PMIC 710, an RFIC 730, and/or a Front End Module (FEM) 740. The PMIC 710 may supply power to the RFIC 730 and may correspond to the PMIC 256 of FIG. 2 or the PMIC 310 of FIG. 3. A connector 720 may include terminals for the connection with another element (for example, the IFIC 240 or the PMIC 230) and may correspond to the connector 320 of FIG. 3. Through the connector 720, an IF signal, an LO signal, and/or power may be input, and the input signal may be applied to the PMIC 710 and/or the RFIC 730.

According to an embodiment, the RFIC 730 is a circuit for processing an RF signal and may include a signal distribution circuit and/or some of RF chains. According to an embodiment, the FEM 740 is a circuit required for signal processing between the RFIC 730 and antenna arrays and may include the remaining RF chains. For example, the remaining RF chains may include a PA and an LNA. According to an embodiment, the RFIC 730 may be implemented as a CMOS, and the FEM 740 may be implemented as a compound semiconductor.

Although not illustrated in FIG. 7, the antenna module 250*a* may include at least one antenna array. According to an embodiment, at least one antenna array may be disposed on a different surface from at least one of the PMIC 710, the connector 720, the RFIC 730, and/or the FEM 740. For example, at least one of the PMIC 710, the connector 720, the RFIC 730, and/or the FEM 740 may be installed in one surface of a substrate (for example, a PCB), and at least one antenna array may be installed in the other surface of the substrate.

Figure 8:
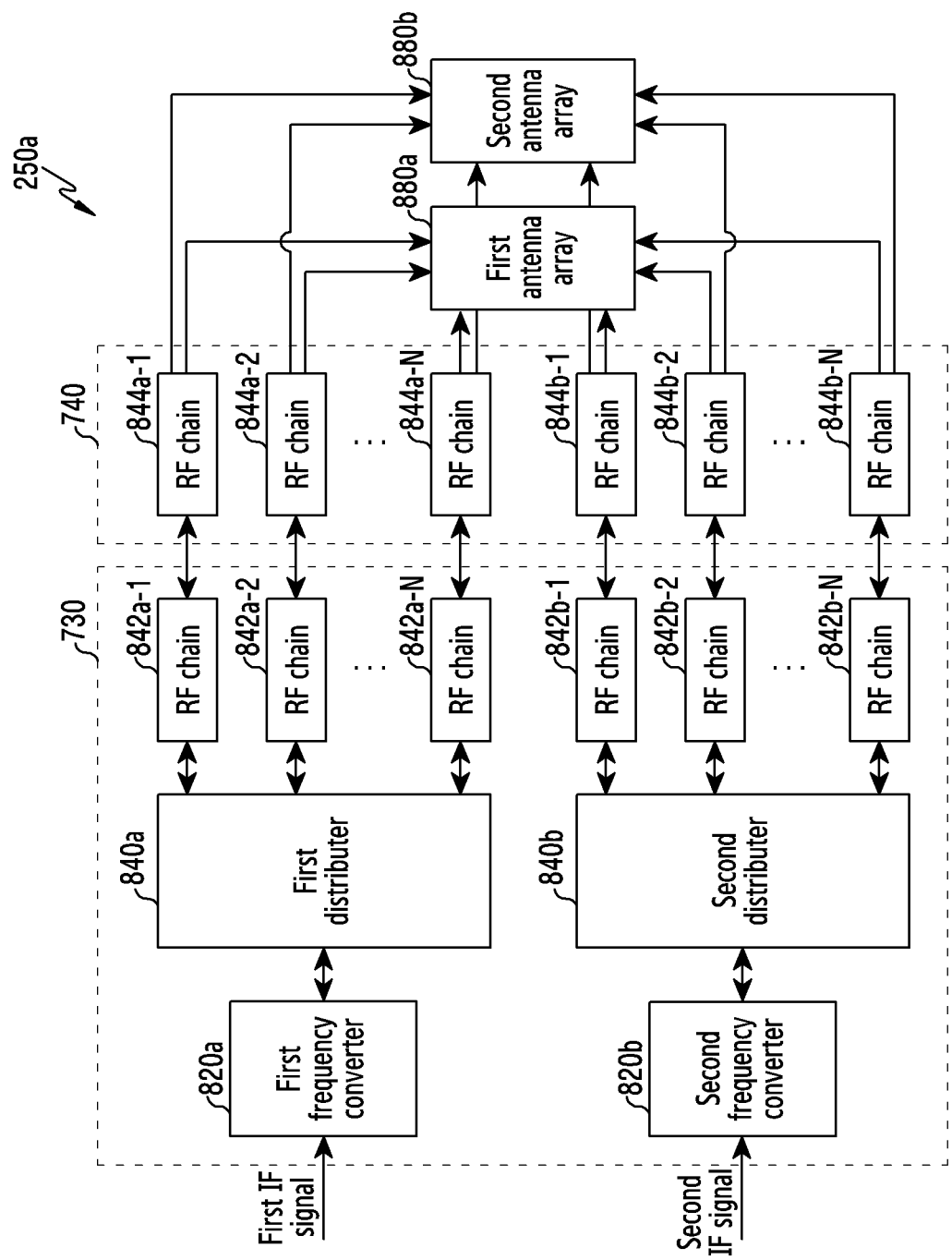
FIG. 8 illustrates an example of an antenna module including segmented RF chains in an electronic device according to an embodiment of the disclosure.

FIG. 8 illustrates an example of a configuration of an antenna module including segmented RF chains in an electronic device according to an embodiment of the disclosure.

Referring to FIG. 8, the antenna module 250*a* according to an embodiment may include at least one of a first frequency converter 820*a*, a second frequency converter 820*b*, a first distributer 840*a*, a second distributer 840*b*, first portions 842*a*-1 to 842*a*-N and 842*b*-1 to 842*b*-N of a plurality of RF chains, second portions 844*a*-1 to 844*a*-N and 844*b*-1 to 844*b*-N of a plurality of RF chains, a first antenna array 880*a*, and/or a second antenna array 880*b*. According to an embodiment, the RFIC 730 may include at least one of the first frequency converter 820*a*, the second frequency converter 820*b*, the first distributer 840*a*, the second distributer 840*b*, and/or the first portions 842*a*-1 to 842*a*-N and 842*b*-1 to 842*b*-N of a plurality of RF chains.

The first frequency converter 820*a* and the second frequency converter 820*b* may convert an IF signal input from the IFIC (for example, the IFIC 240) into an RF signal or convert an RF signal received through the first antenna array 880*a* or the second antenna array 880*b* into an IF signal.

The first distributer 840*a* and the second distributer 840*b* may distribute or multiplex the signal in order to provide the RF signal input from the first frequency converter 820*a* or the second frequency converter 820*b* to at least some of the first portions of the plurality of RF chains 842*a*-1 to 842*a*-N and 842*b*-1 to 842*b*-N. The first distributer 840*a* and the second distributer 840*b* may de-multiplex the signal input from at least some of the first portions of the plurality of RF chains 842*a*-1 to 842*a*-N and 842*b*-1 to 842*b*-N.

According to an embodiment, the first portions of the plurality of RF chains 842*a*-1 to 842*a*-N and 842*b*-1 to 842*b*-N may process (for example, phase shift) the RF signal provided from the first distributer 840*a* or the second distributer 840*b* or the RF signal received through the first antenna array 880*a* or the second antenna array 880*b*. At least some of the plurality of RF chains 842*a*-1 to 842*a*-N and 842*b*-1 to 842*b*-N may be used to form one beam.

According to an embodiment, the FEM 740 may include second portions of the plurality of RF chains 844*a*-1 to 844*a*-N and 844*b*-1 to 844*b*-N. According to an embodiment, the second portions of the plurality of RF chains 844*a*-1 to 844*a*-N and 844*b*-1 to 844*b*-N may be connected to the corresponding first portions of the RF chains. The second portions of the plurality of RF chains 844*a*-1 to 844*a*-N and 844*b*-1 to 844*b*-N may process (for example, amplify) the RF signal provided from the first portions of the plurality of RF chains 842*a*-1 to 842*a*-N and 842*b*-1 to 842*b*-N or the RF signal received through the first antenna array 880*a* or the second antenna array 880*b*.

According to an embodiment, the second portions of the plurality of RF chains 844*a*-1 to 844*a*-N and 844*b*-1 to 844*b*-N may have the structure that can be connected to the first antenna array 880*a* or the second antenna array 880*b*. According to an embodiment, the second portions of the plurality of RF chains 844*a*-1 to 844*a*-N and 844*b*-1 to 844*b*-N may be selectively connected to one of the first antenna array 880*a* or the second antenna array 880*b* during one time instance.

Each of the first antenna array 880*a* and the second antenna array 880*b* may include a plurality of antenna elements. One of the first antenna array 880*a* or the second antenna array 880*b* may be used for communication during one time instance. According to an embodiment, the first antenna array 880*a* and the second antenna array 880*b* may have different characteristics. For example, the first antenna array 880*a* and the second antenna array 880*b* may have at least one of different types (for example, dipole or patch), directions in which established beams, coverage, installation directions, and/or installation locations.

In the structure illustrated in FIG. 8, the first frequency converter 820*a* or the second frequency converter 820*b* may be configured to the same as the frequency converters according to the embodiment described with reference to FIG. 5A. The first distributer 840*a* or the second distributer 840*b* may be configured to be the same as the distributers according to the embodiment described with reference to FIG. 5B. Hereinafter, the structure of RF chains illustrated in FIG. 8 is described with reference to FIG. 9.

Figure 9:
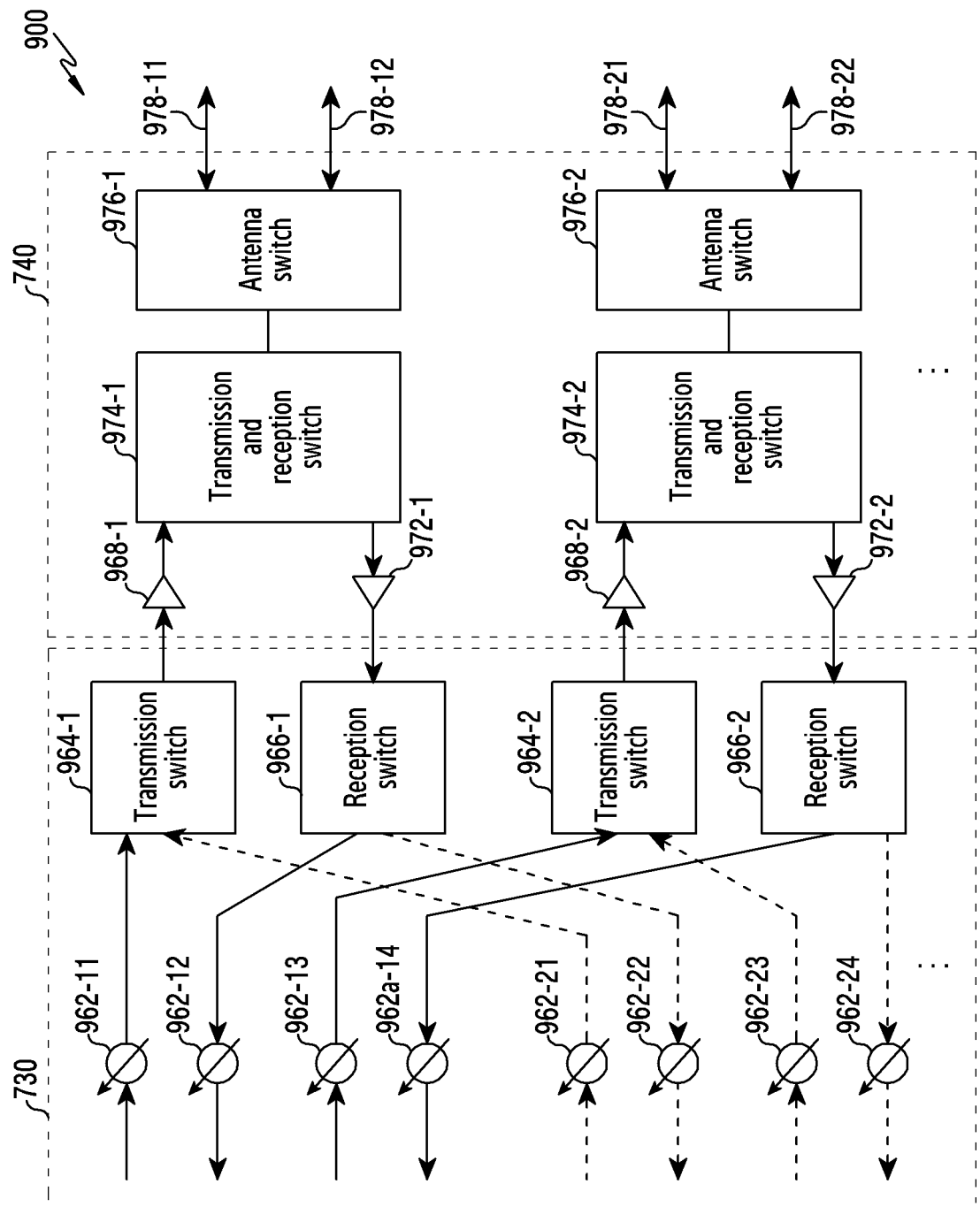
FIG. 9 illustrates an example of a configuration of RF chains within an antenna module including segmented RF chains in an electronic device according to an embodiment of the disclosure.

FIG. 9 illustrates an example of a configuration of RF chains within the antenna module 250*a* including segmented RF chains in the electronic device according to an embodiment of the disclosure.

The configuration of the RF chains 900 illustrated in FIG. 9 may be understood as at least one configuration among the first portions of the RF chains 842*a*-1 to 842*a*-N and 842*b*-1 to 842*b*-N and/or the second portions of the RF chains 844*a*-1 to 844*a*-N and 844*b*-1 to 844*b*-N of FIG. 8. For example, the RF chains 900 illustrated in FIG. 9 may be understood as RF chains connected to the MUXs/DEMUXs 544-11 to 544-12 or the MUXs/DEMUXs 544-21 to 544-22 of FIG. 5B.

Referring to FIG. 9, first portions of the RF chains included in the RFIC 730 according to an embodiment may include at least one of phase shifters 962-11 to 962-14 and 962-21 to 962-24, transmission switches 964-1 and 964-2, and/or reception switches 966-1 and 966-2. Second portions of the RF chains included in the FEM 740 according to an embodiment may include at least one of PAs 968-1 and 968-2, LNAs 972-1 and 972-2, transmission and reception switches 974-1 and 974-2, and/or antenna switches 976-1 and 976-2.

The phase shifters 962-11 to 962-14 and 962-21 to 962-24 may control and then output the phase of the input RF signal. The controlled phase value may be determined by a control signal. For example, the control signal may be input from another element (for example, the CP 220). According to an embodiment, the phase shifters 962-11 to 962-14 and the phase shifters 962-21 to 962-24 may correspond to different antenna arrays. For example, the phase shifters 962-11 to 962-14 may be used to control phases of signals transmitted or received through a first antenna array (for example, the first antenna array 880*a*), and the phase shifters 962-21 to 962-24 may be used to control phases of signals transmitted or received through a second antenna array (for example, the second antenna array 880*b*).

According to an embodiment, the transmission switches 964-1 and 964-2 may selectively output one of signals corresponding to different antenna arrays. For example, the transmission switch 964-1 may output a signal passing through the phase shifter 962-11 or the phase shifter 962-21 to the PA 968-1. The reception switches 966-1 and 966-2 may output a signal received through one of the antenna arrays to a corresponding phase shifter. For example, the reception switch 966-1 may output a signal input from the LNA 972-1 to the phase shifter 962-12 or the phase shifter 962-22. When the signal input to the reception switch 966-1 is a signal received through the first antenna array, the signal may be output to the phase shifter 962-12. When the signal is a signal received through the second antenna array, the signal may be output to the phase shifter 962-22.

The PAs 968-1 and 968-2 may amplify a signal provided from the transmission switch 964-1 or the transmission switch 964-2. The LNAs 972-1 and 972-2 may amplify a signal provided from the transmission and reception switch 974-1 or the transmission and reception switch 974-2.

Each of the transmission and reception switches 974-1 and 974-2 may perform switching between a transmission path and a reception path. For example, when a signal is transmitted, the transmission and reception switch 974-1 may output a signal input from the PA 968-1 to the antenna switch 976-1. When a signal is received, the transmission and reception switch 974-1 may output a signal input from the antenna switch 976-1 to the LNA 972-1.

According to an embodiment, the antenna switches 976-1 and 976-2 may switch a path between the first antenna array or the second antenna array and the transmission and reception switch (for example, the transmission and reception switch 974-1 or the transmission and reception switch 974-2). For example, the antenna switch 976-1 may selectively connect the transmission and reception switch 974-1 to a path 978-11 connected to the first antenna array or a path 978-12 connected to the second antenna array. The antenna switch 976-2 may selectively connect the transmission and reception switch 974-2 to a path 978-21 connected to the first antenna array or a path 978-22 connected to the second antenna array.

The transmission and reception switch 974-1 or 974-2 may have one terminal on one side toward the antenna switch 976-1 or 976-2 and two terminals on the other side. According to an embodiment, the antenna switch 976-1 or 976-2 may have one terminal on one side toward the transmission and reception switch 974-1 or 974-2 and two terminals on the other side. Although FIG. 9 illustrates the transmission and reception switch 974-1 or 974-2 and the antenna switch 976-1 or 976-2 as separate elements, the transmission and reception switch 974-1 or 974-2 and the antenna switch 976-1 or 976-2 may be implemented as a single element according to another embodiment. For example, the transmission and reception switch 974-1 or 974-2 and the antenna switch 976-1 or 976-2 may be implemented as one DPDT.

Figure 10:
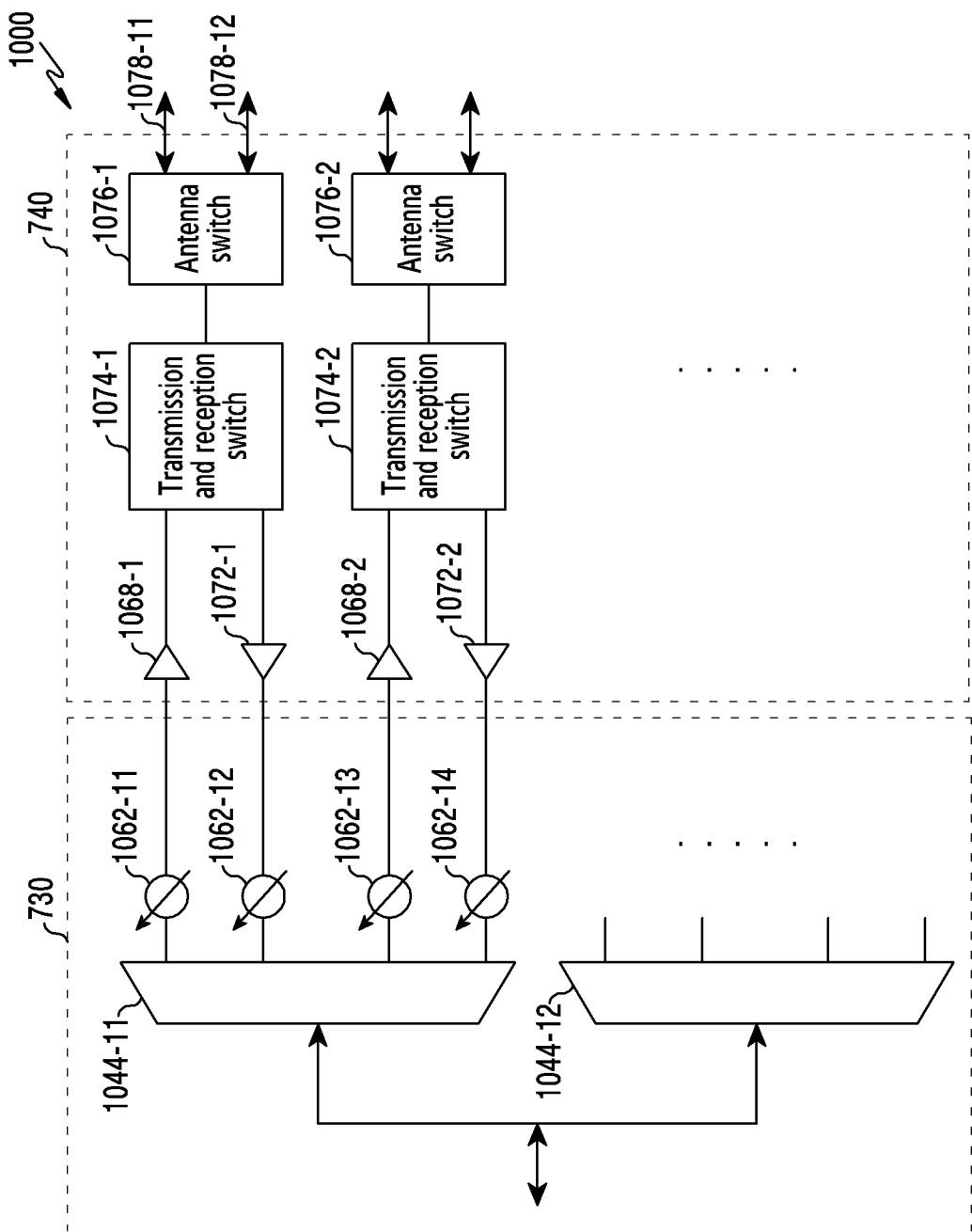
FIG. 10 illustrates another example of a configuration of a distributer and RF chains within an antenna module including segmented RF chains in an electronic device according to an embodiment of the disclosure.

FIG. 10 illustrates another example of a configuration of a distributer and RF chains within an antenna module including segmented RF chains in an electronic device according to an embodiment of the disclosure.

The configuration of the antenna arrays 580 illustrated in FIG. 10 may be understood as the configuration of the first distributer 840*a* and the RF chains 860*a*-1 to 860*a*-N of FIG. 8.

Referring to FIG. 10, a distributer and RF chains 1000 may include at least one of phase shifters 1062-11 to 1062-14 and 1062-21 to 1062-24, transmission switches 1064*a* and 1064*b*, and/or reception switches 1066*a* and 1066*b* included in the RFIC 730. The distributer and the RF chains 1000 may include at least one of PAs 1068-1 and 1068-2, LNAs 1072-1 and 1072-2, transmission and reception switches 1074-1 and 1074-2, and/or antenna switches 1076-1 and 1076-2 included in the FEM 740. Although omitted for convenience of description, the distributer and the RF chains 1000 may further include an element (or elements) equivalent to at least one of the phase shifters 1062-11 to 1062-14, the PAs 1068-1 and 1068-2, the LNAs 1072-1 and 1072-2, the transmission and reception switches 1074-1 and 1074-2, and/or the antenna switches 1076-1 and 1076-2, connected to the MUX/DEMUX 1044-12.

The MUXs/DEMUXs 1044-11 and 1044-12 may output an RF signal input from a frequency converter (for example, the first frequency converter 820*a*) to the phase shifters 1062-11 and 1062-13, or may sum RF signals input from the phase shifters 1062-12 and 1062-14 and then output the RF signal to the frequency converter.

The phase shifters 1062-11 to 1062-14 may control and then output a phase of the input RF signal. The controlled phase value may be determined by a control signal. For example, the control signal may be input from another element (for example, the CP 220). According to an embodiment, the phase shifters 1062-11 to 1062-14 may be shared by antenna arrays (for example, the first antenna array 880*a* and the second antenna array 880*b*). For example, the phase shifter 1062-11 may be used to control the phase of the signal transmitted through the first antenna array during a time instance and used to control the phase of the signal transmitted through the second antenna array during another time instance. Although FIG. 10 illustrates that the phase shifters 1062-11 to 1062-14 and 1062-21 to 1062-24 are included in the RFIC 730, the phase shifters 1062-11 to 1062-14 and 1062-21 to 1062-24 may be included in the FEM 740 according to another embodiment.

The PAs 1068-1 and 1068-2 may amplify the signal input from the phase shifter 1062-11 or 1062-13. The LNAs 1072-1 and 1072-2 may amplify the signal input from the transmission and reception switch 1074-1 or 1074-2.

The transmission and reception switches 1074-1 and 1074-2 may perform switching between a transmission path and a reception path. For example, when a signal is transmitted, the transmission and reception switch 1074-1 may output a signal input from the PA 1068-1 to the antenna switch 1076-1. When a signal is received, the transmission and reception switch 1074-1 may output a signal input from the antenna switch 1076-1 to the LNA 572-1.

According to an embodiment, the antenna switches 1076-1 and 1076-2 may switch a path between the first antenna array or the second antenna array and the transmission and reception switch (for example, the transmission and reception switch 1074-1 or the transmission and reception switch 1074-2). For example, the antenna switch 1076-1 may selectively connect the transmission and reception switch 1074-1 to a path 1078-11 connected to the first antenna array or a path 1078-12 connected to the second antenna array.

The transmission and reception switch 1074-1 or 1074-2 may have one terminal on one side toward the antenna switch 1076-1 or 1076-2 and two terminals on the other side. The antenna switch 1076-1 or 1076-2 may have one terminal on one side toward the transmission and reception switch 1074-1 or 1074-2 and two terminals on the other side. Although FIG. 10 illustrates the transmission and reception switch 1074-1 or 1074-2 and the antenna switch 1076-1 or 1076-2 as separate elements, the transmission and reception switch 1074-1 or 1074-2 and the antenna switch 1076-1 or 1076-2 may be implemented as a single element according to another embodiment. For example, the transmission and reception switch 1074-1 or 1074-2 and the antenna switch 1076-1 or 1076-2 may be implemented as one DPDT.

According to an embodiment, phase shifters which are the same as the number of RF chains and smaller than the number of antenna feeding points may be included. Compared to the example of FIG. 9, the number of phase shifters may be reduced and a plurality of switches (for example, the transmission switches 964-1 and 964-2 and the reception switches 966-1 and 966-2) are excluded, and thus complexity and size of the RF module may be reduced.

According to various embodiments of the disclosure, an electronic device (for example, the electronic device 101) may include a processor, a transceiver including a plurality of RF chains (for example, at least one of the plurality of RF chains 460*a*-1 to 460*a*-N and 460*b*-1 to 460*b*-N, the first portions of the plurality of RF chains 842*a*-1 to 842*a*-N and 842*b*-1 to 842*b*-N, and/or the second portions of the plurality of RF chains 844*a*-1 to 844*a*-N and 844*b*-1 to 844*b*-N), a plurality of switches (for example, at least one of the transmission switches 564-1 and 564-2, the reception switches 566-1 and 566-2, the transmission and reception switches 574-1 and 574-2, and/or the antenna switches 576-1 and 576-2) electrically connected to the plurality of RF chains, a first antenna array (for example, the first antenna array 480*a* or the first antenna array 880*a*) including a plurality of first antenna elements electrically connected to the plurality of switches, and a second antenna array (for example, the second antenna array 480*b* or the second antenna array 880*b*) including a plurality of second antenna elements electrically connected to the plurality of switches. Each of the plurality of RF chains may be configured to be selectively connected to one of the first antenna elements and one of the second antenna elements through one of the plurality of switches. The plurality of switches may include a first switch connected to one of the first antenna elements and one of the second antenna elements and a second switch connected to another one of the first antenna elements and another one of the second antenna elements.

According to an embodiment of the disclosure, the first antenna array (for example, the first antenna array 480*a* or the first antenna array 880*a*) may be used to form beams toward directions within a first coverage, and the second antenna array may be used to form beams toward directions within a second coverage.

According to an embodiment of the disclosure, the first antenna array (for example, the first antenna array 480*a* or the first antenna array 880*a*) may be patch antenna array, and the second antenna array may be a dipole antenna array.

According to an embodiment of the disclosure, the transceiver may include a first circuit (for example, the RFIC 730) configured to convert an Intermediate Frequency (IF) band signal or a baseband signal into an RF band signal and a second circuit (for example, the FEM 740) configured to amplify the RF band signal, wherein the first circuit may be implemented as a Complementary Metal-Oxide Semiconductor (CMOS) and the second circuit may be implemented as a compound semiconductor.

According to an embodiment of the disclosure, the first circuit (for example, the RFIC 730) may further include a phase shifter (for example, at least one of the phase shifters 562-11 to 562-14 and 562-21 to 562-24, the phase shifters 662-11 to 662-14, the phase shifters 962-11 to 962-14 and 962-21 to 962-24, and/or the phase shifters 1062-11 to 1062-14 and 1062-21 to 1062-24) configured to control a phase of the RF band signal.

According to an embodiment of the disclosure, the second circuit (for example, the FEM 740) may further include a phase shifter (for example, at least one of the phase shifters 562-11 to 562-14 and 562-21 to 562-24, the phase shifters 662-11 to 662-14, the phase shifters 962-11 to 962-14 and 962-21 to 962-24, and/or the phase shifters 1062-11 to 1062-14 and 1062-21 to 1062-24) configured to control a phase of the RF band signal.

According to an embodiment of the disclosure, each of the RF chains (for example, at least one of the plurality of RF chains 460*a*-1 to 460*a*-N and 460*b*-1 to 460*b*-N, the first portions of the plurality of RF chains 842*a*-1 to 842*a*-N and 842*b*-1 to 842*b*-N, and/or the second portions of the plurality of RF chains 844*a*-1 to 844*a*-N and 844*b*-1 to 844*b*-N) may include a first phase shifter (for example, the phase shifter 599-21) configured to control a phase of a signal transmitted or received through one of the first antenna elements, a second phase shifter (for example, the phase shifter 599-21) configured to control a phase of a signal transmitted or received through one of the second antenna elements, and a switch (for example, the transmission switch 564-1) configured to switch between the first phase shifter and the second phase shifter.

According to an embodiment of the disclosure, each of the RF chains (for example, at least one of the plurality of RF chains 460*a*-1 to 460*a*-N and 460*b*-1 to 460*b*-N, the first portions of the plurality of RF chains 842*a*-1 to 842*a*-N and 842*b*-1 to 842*b*-N, and/or the second portions of the plurality of RF chains 844*a*-1 to 844*a*-N and 844*b*-1 to 844*b*-N) may include a phase shifter (for example, the phase shifter 662-11) configured to control phases of a signal transmitted or received through one of the first antenna elements and a signal transmitted or received through one of the second antenna elements.

According to an embodiment of the disclosure, a number of RF chains (for example, at least one of the plurality of RF chains 460*a*-1 to 460*a*-N and 460*b*-1 to 460*b*-N, the first portions of the plurality of RF chains 842*a*-1 to 842*a*-N and 842*b*-1 to 842*b*-N, and/or the second portions of the plurality of RF chains 844*a*-1 to 844*a*-N and 844*b*-1 to 844*b*-N) may be smaller than a sum of a number of feeding points (for example, the feeding points 582-11 to 582-18) of the first antenna elements and a number of feeding points (for example, the feeding points 582-21 to 582-28) of the second antenna elements.

According to an embodiment of the disclosure, the plurality of switches (for example, the antenna switches 576-1 and 576-2) may include at least one antenna selection switch.

According to an embodiment of the disclosure, the transceiver and the plurality of switches may be disposed on a first surface of a substrate, and at least one of the first antenna array (for example, the first antenna array 480*a* or the first antenna array 880*a*) and/or the second antenna array (for example, the second antenna array 480*b* or the second antenna array 880*b*) may be disposed on a second surface of the substrate.

According to an embodiment of the disclosure, the electronic device may further include a Power Management Integrated Circuit (PMIC) configured to supply power to the transceiver and a connector including terminals for connecting the transceiver with the IFIC, wherein the PMIC and the connector may be disposed on the first surface of the substrate.

Figure 11:
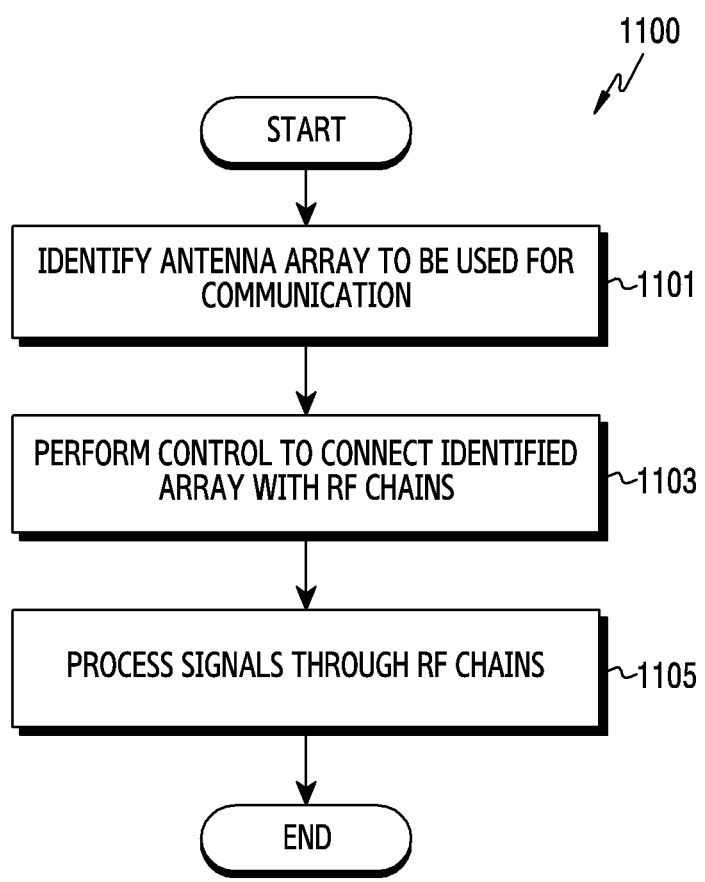
FIG. 11 is a flowchart illustrating a process in which an electronic device controls RF chains according to an embodiment of the disclosure.

FIG. 11 is a flowchart illustrating a process in which an electronic device controls RF chains according to an embodiment of the disclosure.

The entity of the operation of the flowchart illustrated in FIG. 11 may be understood as the electronic device 101 or the element of the electronic device 101 (for example, the processor 120, the AP 210, or the CP 220).

Referring to FIG. 11, in a method 1100, in operation 1101, the electronic device 101 may identify an antenna array (for example, the first antenna array 480*a* or the second antenna array 480*b*) to be used for communication. The electronic device 101 may include a plurality of antenna arrays (for example, the first antenna array 480*a* and/or the second antenna array 480*b*), and may perform communication using one of the plurality of antenna arrays during one time instance. The plurality of antenna arrays may correspond to beam sets covering different directions. For example, the electronic device 101 may identify a direct of a beam to be formed and identify an antenna array which can form the identified direction of the beam.

In operation 1103, the electronic device 101 may perform control to connect the identified antenna array with RF chains (for example, at least one of the RF chains 460*a*-1 to 460*a*-N and 460*b*-1 to 460*b*-N, the first portions of RF chains 842*a*-1 to 842*a*-N and 842*b*-1 to 842*b*-N, and/or the second portions of RF chains 844*a*-1 to 844*a*-N and 844*b*-1 to 844*b*-N). The number of antenna feeding points (for example, the plurality of antenna feeding points 582-11 to 582-18 or the plurality of antenna feeding points 582-21 to 582-28 of FIG. 5D) included in plurality of antenna arrays (for example, the first antenna array 480*a* and/or the second antenna array 480*b*) may be larger than the number of RF chains. Since the number of RF chains is smaller than the number of antenna feeding points, RF chains cannot be always connected to all antenna feeding points. As one of the plurality of antenna arrays is selectively connected to RF chains through switches, the antenna array may be in the state that can be used for signal transmission or reception.

In operation 1105, the electronic device 101 may process a signal through RF chains. The electronic device 101 may perform a phase control operation and/or amplification operation through RF chains.

According to various embodiments of the disclosure, a method of operating an electronic device (for example, the electronic device 101) may include an operation of identifying an antenna array to be used for communication among a plurality of antenna arrays (for example, the first antenna array 480*a* or the second antenna array 480*b*), an operation of connecting antenna elements of the identified antenna array with RF chains (for example, at least one of the RF chains 460*a*-1 to 460*a*-N and 460*b*-1 to 460*b*-N, the first portions of RF chains 842*a*-1 to 842*a*-N and 842*b*-1 to 842*b*-N, and/or the second portions of RF chains 844*a*-1 to 844*a*-N and 844*b*-1 to 844*b*-N), and an operation of processing signals through the RF chains.

According to various embodiments of the disclosure, the operation of identifying the antenna array may include an operation of identifying a direction of a beam to be formed and an operation of identifying an antenna array which can form the beam of the identified direction.

According to various embodiments of the disclosure, the plurality of antenna arrays may include a first antenna array (for example, the first antenna array 480*a* or the first antenna array 880*a*) and a second antenna array, the first antenna array may be used to form beams toward directions within a first coverage, and the second antenna array may be used to form beams toward directions within a second coverage.

According to various embodiments of the disclosure, the plurality of antenna arrays may include a first antenna array (for example, the first antenna array 480*a* or the first antenna array 880*a*) and a second antenna array, the first antenna array may be a patch antenna array, and the second antenna array may be a dipole antenna array.

According to various embodiments of the disclosure, a number of RF chains (for example, at least one of the RF chains 460a-1 to 460a-N and 460b-1 to 460b-N, the first portions of RF chains 842a-1 to 842a-N and 842b-1 to 842b-N, and/or the second portions of RF chains 844a-1 to 844a-N and 844b-1 to 844b-N) may be smaller than a number of feeding points (for example, the feeing points 582-11 to 582-18 and/or the feeing points 582-21 to 582-28) of antenna elements included in the plurality of antenna arrays.

According to various embodiments of the disclosure, the operation of processing the signals through the RF chains (for example, at least one of the RF chains 460a-1 to 460a-N and 460b-1 to 460b-N, the first portions of RF chains 842a-1 to 842a-N and 842b-1 to 842b-N, and/or the second portions of RF chains 844a-1 to 844a-N and 844b-1 to 844b-N) may include an operation of converting an Intermediate Frequency (IF) band signal or a baseband signal into an RF band signal through a first circuit (for example, the RFIC 730) and an operation of amplifying the RF band signal through a second circuit (for example, the FEM 740), wherein the first circuit may be implemented as a Complementary Metal-Oxide Semiconductor (CMOS) and the second circuit may be implemented as a compound semiconductor.

According to various embodiments of the disclosure, the first circuit (for example, the RFIC 730) may include a phase shifter (for example, at least one of the phase shifters 562-11 to 562-14 and 562-21 to 562-24, the phase shifters 662-11 to 662-14, the phase shifters 962-11 to 962-14 and 962-21 to 962-24, and/or the phase shifters 1062-11 to 1062-14 and 1062-21 to 1062-24) configured to control a phase of the RF band signal.

According to various embodiments of the disclosure, the second circuit (for example, the FEM 740) may include a phase shifter (for example, at least one of the phase shifters 562-11 to 562-14 and 562-21 to 562-24, the phase shifters 662-11 to 662-14, the phase shifters 962-11 to 962-14 and 962-21 to 962-24, and/or the phase shifters 1062-11 to 1062-14 and 1062-21 to 1062-24) configured to control a phase of the RF band signal.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a processor;
an intermediate frequency integrated circuit (IFIC) electrically connected with the processor;
a first antenna array comprising a plurality of first antenna elements;
a second antenna array comprising a plurality of second antenna elements; and
a transceiver including:
a frequency converter electrically connected to the IFIC,
a multiplexer/demultiplexer electrically connected to the frequency converter,
first radio frequency (RF) chains electrically connected with the IFIC, wherein the first RF chains include a first RF chain and a second RF chain, wherein the first RF chain includes a first phase shifter and is electrically connected to a first switch, wherein the second RF chain includes a second phase shifter and is electrically connected to a second switch, wherein the first phase shifter is configured to control a first phase of a first signal transmitted through the first antenna array and the second phase shifter is configured to control a second phase of a second signal received through the first antenna array,
second RF chains electrically connected with the IFIC, wherein the second RF chains include a third RF chain and a fourth RF chain, wherein the third RF chain includes a third phase shifter and is electrically connected to the first switch, wherein the fourth RF chain includes a fourth phase shifter and is electrically connected to the second switch, wherein the third phase shifter is configured to control a third phase of a third signal transmitted through the second antenna array and the fourth phase shifter is configured to control a fourth phase of a fourth signal received through the second antenna array, and
a plurality of switches including a transmission and reception switch and an antenna switch, wherein the transmission and reception switch is configured to:
electrically connect the first switch to the first antenna array or the second antenna array through a first power amplifier (PA); or
electrically connect the second switch to the first antenna array or the second antenna array through a first low noise amplifier (LNA),
wherein the antenna switch selectively connects the transmission and reception switch to the first antenna array or the second antenna array,
wherein the multiplexer/demultiplexer is configured to output RF signals from the frequency converter to the first phase shifter and the third phase shifter or sum RF signals from the second phase shifter and the fourth phase shifter to the frequency converter,
wherein the multiplexer/demultiplexer includes:
first-state multiplexers/demultiplexers electrically connected to the frequency converter, and
second-state multiplexers/demultiplexers electrically connected to the first-state multiplexers/demultiplexers and electrically connected to the first RF chains and the second RF chains, and
wherein the processor is configured to:
identify an antenna array used for communication among the first antenna array and the second antenna array,
control the first switch to selectively connect the first RF chain including the first phase shifter to the first antenna array through the first PA, or the third RF chain including the third phase shifter to the second antenna array through the first PA based on the identified antenna array, and
perform the communication using the first RF chain and the first antenna array, or using the third RF chain and the second antenna array.

2. The electronic device of claim 1,
wherein the first antenna array is used to form beams toward directions within a first coverage, and
wherein the second antenna array is used to form beams toward directions within a second coverage.

3. The electronic device of claim 1,
wherein the first antenna array is a patch antenna array, and
wherein the second antenna array is a dipole antenna array.

4. The electronic device of claim 1,
wherein the transceiver comprises:
a first circuit configured to convert an intermediate frequency (IF) band signal or a baseband signal into an RF band signal; and
a second circuit configured to amplify the RF band signal,
wherein the first circuit is implemented as a complementary metal-oxide semiconductor (CMOS), and
wherein the second circuit is implemented as a compound semiconductor.

5. The electronic device of claim 1, wherein a number of the first RF chains and the second RF chains is smaller than a sum of a number of feeding points of the plurality of first antenna elements and a number of feeding points of the plurality of second antenna elements.

6. The electronic device of claim 1,
wherein the transceiver and the plurality of switches are disposed on a first surface of a substrate, and
wherein at least one of the first antenna array or the second antenna array is disposed on a second surface of the substrate.

7. The electronic device of claim 6, further comprising:
a power management integrated circuit (PMIC) configured to supply power to the transceiver; and
a connector comprising terminals for connecting the transceiver with the IFIC,
wherein the PMIC and the connector are disposed on the first surface of the substrate.

* * * * *